(12) United States Patent
Hidaka et al.

(10) Patent No.: US 9,303,124 B2
(45) Date of Patent: Apr. 5, 2016

(54) SOLUTION FOR FORMATION OF ORGANIC THIN FILM, AND METHOD FOR PRODUCTION THEREOF

(75) Inventors: Tomoya Hidaka, Ichihara (JP); Toshiaki Takahashi, Ichihara (JP); Kazuhisa Kumazawa, Chiba (JP)

(73) Assignee: NIPPON SODA CO., LTD., Tokyo (JP)

( * ) Notice: Subject to any disclaimer, the term of this patent is extended or adjusted under 35 U.S.C. 154(b) by 369 days.

(21) Appl. No.: 12/866,899

(22) PCT Filed: Feb. 23, 2009

(86) PCT No.: PCT/JP2009/000763
§ 371 (c)(1),
(2), (4) Date: Aug. 10, 2010

(87) PCT Pub. No.: WO2009/104424
PCT Pub. Date: Aug. 27, 2009

(65) Prior Publication Data
US 2010/0324210 A1   Dec. 23, 2010

(30) Foreign Application Priority Data

Feb. 22, 2008 (JP) .................. 2008-041797
May 12, 2008 (JP) .................. 2008-125252

(51) Int. Cl.
| | | |
|---|---|---|
| *C08K 5/1535* | (2006.01) |
| *C08G 77/06* | (2006.01) |
| *C08G 77/04* | (2006.01) |
| *C08G 79/00* | (2006.01) |
| *C08G 79/12* | (2006.01) |
| *C09D 185/00* | (2006.01) |
| *C09D 183/04* | (2006.01) |
| *C08G 77/16* | (2006.01) |
| *C08G 77/18* | (2006.01) |

(52) U.S. Cl.
CPC .............. *C08G 77/06* (2013.01); *C08G 77/045* (2013.01); *C08G 79/00* (2013.01); *C08G 79/12* (2013.01); *C09D 183/04* (2013.01); *C09D 185/00* (2013.01); *C08G 77/16* (2013.01); *C08G 77/18* (2013.01); *C23C 2222/20* (2013.01)

(58) Field of Classification Search
CPC .... H01J 29/861; C08G 77/045; C09D 183/06
USPC .......................................... 524/730, 731, 751
See application file for complete search history.

(56) References Cited

U.S. PATENT DOCUMENTS

| | | | | |
|---|---|---|---|---|
| 4,877,820 A | * | 10/1989 | Cowan ........................ | 523/222 |
| 5,200,167 A | * | 4/1993 | Maeda et al. ................. | 423/610 |
| 5,576,408 A | * | 11/1996 | Igarashi et al. ................ | 528/12 |
| 5,844,060 A | * | 12/1998 | Furuya et al. .................. | 528/30 |
| 2004/0235971 A1 | | 11/2004 | Hamada et al. | |
| 2005/0167004 A1 | | 8/2005 | Kimura et al. | |
| 2006/0188657 A1 | * | 8/2006 | Kimura et al. ............. | 427/407.2 |
| 2006/0239902 A1 | * | 10/2006 | Kimura et al. ........... | 423/594.17 |
| 2008/0081212 A1 | * | 4/2008 | Inbe et al. .................... | 428/651 |
| 2008/0213494 A1 | * | 9/2008 | Kimura et al. ............. | 427/430.1 |
| 2009/0281238 A1 | * | 11/2009 | Hidaka et al. ................. | 524/588 |
| 2010/0324210 A1 | * | 12/2010 | Hidaka et al. ................. | 524/751 |
| 2011/0214784 A1 | * | 9/2011 | Inbe et al. ...................... | 148/22 |

FOREIGN PATENT DOCUMENTS

| | | |
|---|---|---|
| EP | 1 797 967 A1 | 6/2007 |
| EP | 2 161 080 A1 | 3/2010 |
| JP | A-4-132637 | 5/1992 |
| JP | A-4-221630 | 8/1992 |
| JP | A-4-367721 | 12/1992 |
| JP | A-8-337654 | 12/1996 |
| JP | A-9-71654 | 3/1997 |
| JP | A-10-292048 | 11/1998 |
| JP | A-11-228942 | 8/1999 |
| JP | A-11-322368 | 11/1999 |
| JP | A-2000-191787 | 7/2000 |
| JP | A-2000-328004 | 11/2000 |
| JP | A-2000-336312 | 12/2000 |
| JP | A-2004-165401 | 6/2004 |
| JP | A-2006-70078 | 3/2006 |
| JP | A-2007-91873 | 4/2007 |
| JP | 2007262577 A * | 10/2007 |
| JP | A-2007-326848 | 12/2007 |

| JP | A-2008-19285 | 1/2008 |
| JP | A-2009-73964 | 4/2009 |
| WO | WO 03/076064 A1 | 9/2003 |
| WO | WO 2007/020781 A1 | 2/2007 |

OTHER PUBLICATIONS

K. Kojio et al., "Novel Method to Prepare Organosilane Monolayers on Solid Substrate," *Bull. Chem. Soc. Jpn.*, vol. 74, No. 8, pp. 1397-1401, 2001.

International Search Report dated Jun. 2, 2909 in International Application No. PCT/JP2009/000763.

International Preliminary Report on Patentability issued on Oct. 5, 2010 in International Patent Application No. PCT/JP2009/000763.

Apr. 24, 2012 Supplementary European Search Report issued in European Application No. 09712789.8.

\* cited by examiner

*Primary Examiner* — Michael A Salvitti
(74) *Attorney, Agent, or Firm* — Oliff PLC

(57) ABSTRACT

It is to provide a solution for forming an organic metal thin film that can form rapidly a dense monomolecular film with less impurity. A solution for forming an organic thin film comprising (A) at least one organic metal compound shown by the following formula (I) (provided that at least one organic metal compound contains a hydroxyl group);

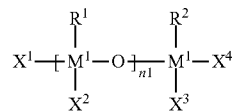

and (B) at least one organic metal compound shown by the following formula (II), $$R^3_m M^2 X^5_{4-m} \quad (II)$$

wherein the solution is
$40 \le [(A)/\{(A)+(B)\}] \times 100 \le 100$ (mass %), and
$0 \le [(B)/\{(A)+(B)\}] \times 100 \le 60$ (mass %); or
a solution for forming an organic thin film comprising an organic metal compound having at least one hydroxyl group and at least one hydrolysable group among the organic metal compounds shown by the following formula (I); or a solution for forming an organic thin film wherein the mass ratio of trimer with respect to dimer is greater than 0.5 among the metal organic compound shown by formula (I).

4 Claims, 1 Drawing Sheet

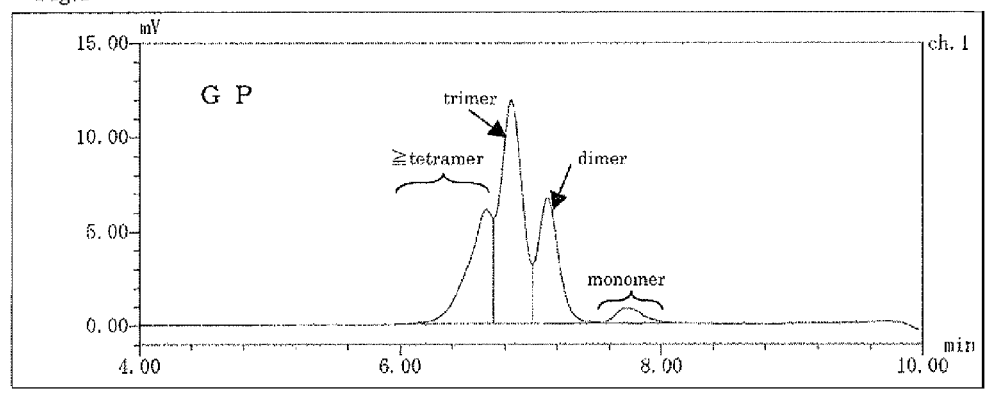
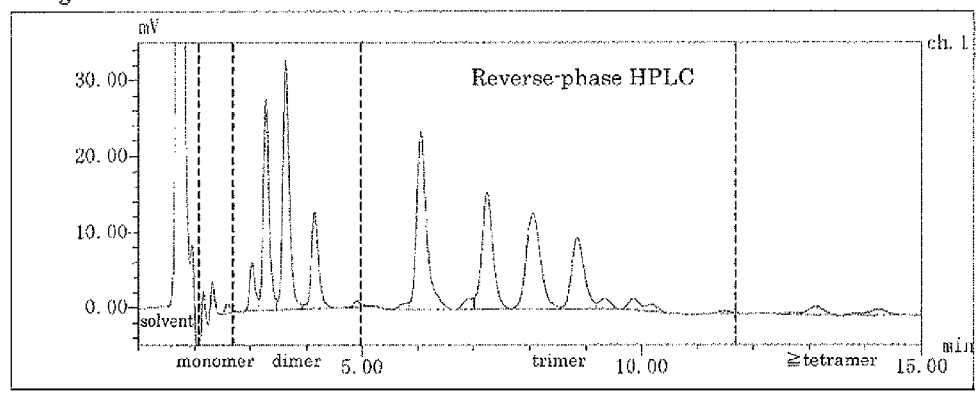

SOLUTION FOR FORMATION OF ORGANIC THIN FILM, AND METHOD FOR PRODUCTION THEREOF

TECHNICAL FIELD

The present invention is an invention related to the production of organic thin film, particularly to the production of a solution for forming an organic thin film suitable for forming an organic thin film.

BACKGROUND ART

Conventionally, property modification of a surface of a substrate consisting of glass, metal, plastic, ceramics, etc. is performed in various fields, according to its purpose. For example, a method comprising coating a fluorine-containing silane coupling agent, in order to confer water repellency and oil repellency to the surface of glass or plastics can be exemplified.

Organic metal compounds such as fluorine-containing silane coupling agent form a film by hydrolytic condensation. Herein, such film is referred to as organic metal thin film.

As a method for forming an organic metal thin film to modify the properties of a substrate surface, the following methods are known so far.

(1) Patent Documents 1 to 3 disclose a method for producing a chemisorbed film, which has high peel resistance and high transparence, and which gloss of the substrate surface and transparency of the substrate are not lost. However, these methods comprise forming a coating by a dehydrochloric acid reaction of a chlorosilane surfactant and an active hydrogen of the substrate surface, which had drawbacks of generating a harmful chlorine gas when producing the film.

(2) A method for forming a chemisorbed film by a dealcohol reaction of alkoxysilane surfactant is also known. However, this method had drawbacks in that the reaction velocity of dealcohol reaction is slow and that the film forming was not easy to conduct.

Further, a method of promoting dealcohol reaction by using a dealcohol catalyst is proposed, while by merely adding a dealcohol catalyst, the surfactant will cross-link by itself due to the moisture in the air, thereby inhibiting the reaction in the solid-liquid interface of the substrate surface, and it was difficult to form a monomolecular chemisorbed film with good efficiency.

(3) In order to resolve these problems, in Patent Document 4 is proposed a method for forming a chemisorbed film covalently-bound via a siloxane-bond, by allowing the substrate surface to contact with a mixed solution containing at least an alkoxysilane surfactant, a non-aqueous solvent not containing active hydrogen, and a silanol condensation catalyst. In the document, as a silanol condensation catalyst, at least one substance selected from metal carboxylate, metal carboxylate ester, metal carboxylate polymer, metal chelate carboxylate, titanate ester, and titanate ester chelate, is exemplified.

(4) Further, as a method for forming a chemisorbed film having crystalline property on a substrate surface, a method of forming a crystalline monomolecular film comprising developing an organic solvent solution of silane surfactant on a silicone wafer surface where purified water has been dropped, is disclosed in Non-Patent Document 1.

(5) Further, in Patent Documents 5 and 6, it is known a method for fixing a water-repellant coating film consisting of monomolecular layer, to a substrate surface via a silanol group, by using a monomer or polymer of a hydrolysate of fluoroalkyl group-containing silane compound which has been hydrolyzed in the presence of an acid catalyst.

Patent Document 1: Japanese Laid-Open Patent Application No. 4-132637
Patent Document 2: Japanese Laid-Open Patent Application No. 4-221630
Patent Document 3: Japanese Laid-Open Patent Application No. 4-367721
Patent Document 4: Japanese Laid-Open Patent Application No. 8-337654
Patent Document 5: Japanese Laid-Open Patent Application No. 11-228942
Patent Document 6: Japanese Laid-Open Patent Application No. 11-322368
Non-Patent Document 1: Bull. Chem. Soc. Jpn., 74, 1397-1401 (2001)

DISCLOSURE OF THE INVENTION

Object to be Solved by the Present Invention

The present invention has been made based on such circumstances, and the object is to provide a solution for forming an organic thin film that can form rapidly a dense monomolecular film or organic thin film with less impurity.

Means to Solve the Object

The present inventors made a keen study in order to solve the above object, and they have found out that by performing hydrolytic condensation of an organic metal compound by using an acid catalyst and a particular polar solvent, a hydrolysable group derived from the organic metal compound and having an OH group remains adequately without being completely degraded, and that a condensate comprising a condensate with a low condensation degree can be easily produced. Further, they found out that by using a solution for forming an organic thin film formed by diluting such produced condensate with a solvent, a dense monomolecular film or an organic thin film with less impurity can be rapidly formed on a substrate.

Further, the present inventors found out that a dense monomolecular film or an organic thin film with less impurity can be also rapidly formed on a substrate, similarly as in the above, by allowing to contain a certain amount or more of an organic metal compound with a low condensation degree, or by adjusting the mass ratio of organic metal compounds having different condensation degrees. The present invention has been thus completed.

Specifically, the present invention relates to:
[1] a solution for forming an organic thin film comprising:
(A) at least one organic metal compound shown by formula (I) (provided that at least one organic metal compound contains a hydroxyl group)

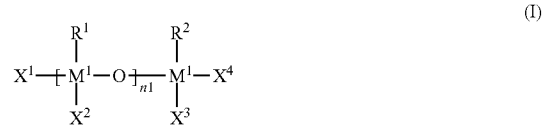

(wherein $R^1$ and $R^2$ represent a hydrocarbon group with 1 to 30 carbons optionally having a substituent, or a halogenated hydrocarbon group with 1 to 30 carbons optionally having a substituent;

X¹, X², X³ and X⁴ each independently represents R¹, R², a hydroxyl group or a hydrolysable group; provided that not all of X¹, X², X³ and X⁴ are R¹ or R²; when n1 is 2 or more, each R¹ and each X² may be the same or different;

X¹ and X⁴ may together form an oxygen atom, to form a ring wherein M¹ and oxygen atom are alternately bonded;

M¹ represents at least one metal atom selected from the group consisting of Si, Ge, Sn, Ti and Zr; and n1 represents an integer of 1 or more); and (B) at least one organic metal compound shown by formula (II)

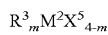  (II)

(wherein R³ represents a hydrocarbon group with 1 to 30 carbons optionally having a substituent, or a halogenated hydrocarbon group with 1 to 30 carbons optionally having a substituent;

M² represents at least one metal atom selected from the group consisting of Si, Ge, Sn, Ti and Zr;

X⁵ represents a hydroxyl group or a hydrolysable group;

and m represents an integer of 1 to 3);

wherein the solution is

40≤[(A)/{(A)+(B)}]×100≤100 (mass %), and 0≤[(B)/{(A)+(B)}]×100≤60 (mass %);

[2] the solution for forming an organic thin film according to [1], wherein n1 is an integer of 1 to 4;

[3] the solution for forming an organic thin film according to [1] or [2], wherein the mass ratio of the organic metal compound in which n1=2 with respect to the organic metal compound in which n1=1 in the organic metal compound shown by formula (I) is greater than 0.5;

[4] the solution for forming an organic thin film according to any one of [1] to [3], comprising at least one organic metal compound selected from the group consisting of: at least one organic metal compound shown by formula (III)

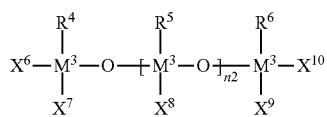  (III)

(wherein R⁴, R⁵ and R⁶ each independently represents a hydrocarbon group with 1 to 30 carbons optionally having a substituent, or a halogenated hydrocarbon group with 1 to 30 carbons optionally having a substituent;

X⁶, X⁷, X⁸, X⁹ and X¹⁰ each independently represents any one of R⁴ to R⁶, a hydroxyl group or a hydrolysable group;

provided that not all of X⁶, X⁷, X⁸, X⁹ and X¹⁰ are any one of R⁴ to R⁶, and at least one of X⁶, X⁷, X⁸, X⁹ and X¹⁰ represents a hydroxyl group, and at least one of them represents a hydrolysable group;

when n2 is 2 or more, each R⁵ and each X⁸ may be the same or different; M³ represents at least one metal atom selected from the group consisting of Si, Ge, Sn, Ti and Zr; and n2 represents 0 or an integer of 1 or more); and at least one cyclic organic metal compound represented by formula (IV)

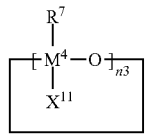  (IV)

(wherein R⁷ represents a hydrocarbon group with 1 to 30 carbons optionally having a substituent, or a halogenated hydrocarbon group with 1 to 30 carbons optionally having a substituent; X¹¹ represents R⁷, a hydroxyl group or a hydrolysable group; provided that not all of X¹¹ are R⁷, and at least one of X¹¹ represents a hydroxyl group, and at least one of X¹¹ represents a hydrolysable group;

each R⁷ and each X¹¹ may be the same or different;

M⁴ represents at least one metal atom selected from the group consisting of Si, Ge, Sn, Ti and Zr; and n3 represents an integer of 2 or more);

[5] the solution for forming an organic thin film according to [4], wherein n2 is an integer of 0 to 3 in formula (III), and n3 is an integer of 2 to 5 in formula (IV); and

[6] the solution for forming an organic thin film according to [4] or [5], wherein the total amount of the organic metal compound shown by formula (III) and the cyclic organic metal compound shown by formula (IV) in the organic metal compound shown by formula (I) is 30 to 95 mass %.

Further, the present invention relates to:

[7] a solution for forming an organic thin film comprising at least one organic metal compound selected from the group consisting of:

at least one organic metal compound shown by formula (III)

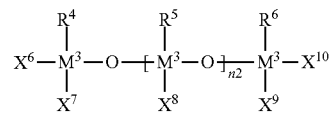  (III)

(wherein R⁴, R⁵ and R⁶ each independently represents a hydrocarbon group with 1 to 30 carbons optionally having a substituent, or a halogenated hydrocarbon group with 1 to 30 carbons optionally having a substituent;

X⁶, X⁷, X⁸, X⁹ and X¹⁰ each independently represents any one of R⁴ to R⁶, a hydroxyl group or a hydrolysable group;

provided that not all of X⁶, X⁷, X⁸, X⁹ and X¹⁰ are any one of R⁴ to R6, and at least one of X⁶, X⁷, X⁸, X⁹ and X¹⁰ represents a hydroxyl group and at least one of them represents a hydrolysable group;

when n2 is 2 or more, each R⁵ and each X⁸ may be the same or different;

M³ represents at least one metal atom selected from the group consisting of Si, Ge, Sn, Ti and Zr;

n2 represents 0 or an integer of 1 or more); and at least one cyclic organic metal compound shown by formula

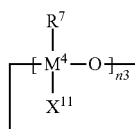  (IV)

(wherein R[7] represents a hydrocarbon group with 1 to 30 carbons optionally having a substituent, or a halogenated hydrocarbon group with 1 to 30 carbons optionally having a substituent; $X^{11}$ represents R[7], a hydroxyl group or a hydrolysable group; provided that not all of $X^{11}$ are R[7], and at least one of $X^{11}$ represents a hydroxyl group, and at least one of $X^{11}$ represents a hydrolysable group;

each R[7] and each $X^{11}$ may be the same or different;

M[4] represents at least one metal atom selected from the group consisting of Si, Ge, Sn, Ti, and Zr; and n3 represents an integer of 2 or more);

[8] the solution for forming an organic thin film according to [7], wherein n2 is an integer of 0 to 3 in formula (III), and n3 is an integer of 2 to 5 in formula (IV);

[9] the solution for forming an organic thin film according to [7] or [8], wherein in at least one organic metal compound shown by formula (I) (provided that at least one organic metal compound contains a hydroxyl group)

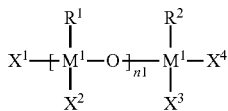

(wherein R[1] and R[2] represent a hydrocarbon group with 1 to 30 carbons optionally having a substituent, or a halogenated hydrocarbon group with 1 to 30 carbons optionally having a substituent; $X^1$, $X^2$, $X^3$ and $X^4$ each independently represents R[1], R[2], a hydroxyl group or a hydrolysable group; provided that not all of $X^1$, $X^2$, $X^3$ and $X^4$ are R[1] or R[2]; when n1 is 2 or more, each R[1] and each $X^2$ may be the same or different;

$X^1$ and $X^4$ may together form an oxygen atom, to form a ring wherein M[1] and oxygen atom are alternately bonded;

M[1] represents at least one metal atom selected from the group consisting of Si, Ge, Sn, Ti and Zr; and n1 represents an integer of 1 or more), the total amount of the organic metal compound shown by formula (III) and the cyclic organic metal compound shown by formula (IV) is 30 to 95 mass %; and

[10] the solution for forming an organic thin film according to any one of [7] to [9], wherein the cyclic organic metal compound shown by formula (IV) is a main component in the mixture of the organic metal compound shown by formula (III) and the cyclic organic metal compound shown by formula (IV).

Further, the present invention relates to

[11] a solution for forming an organic thin film comprising at least one organic metal compound shown by formula (I) (provided that at least one organic metal compound contains a hydroxyl group)

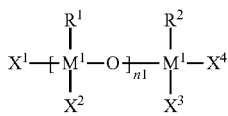

(wherein R[1] and R[2] represent a hydrocarbon group with 1 to 30 carbons optionally having a substituent, or a halogenated hydrocarbon group with 1 to 30 carbons optionally having a substituent; $X^1$, $X^2$, $X^3$ and $X^4$ each independently represents R[1], R[2], a hydroxyl group or a hydrolysable group; provided that not all of $X^1$, $X^2$, $X^3$ and $X^4$ are R[1] or R[2]; each R[1] and each $X^2$ may be the same or different;

$X^1$ and $X^4$ may together form an oxygen atom, to form a ring wherein M[1] and oxygen atom are alternately bonded;

M[1] represents at least one metal atom selected from the group consisting of Si, Ge, Sn, Ti and Zr; and n1 represents an integer of 1 or more); wherein the mass ratio of the organic metal compound in which n1=2 with respect to the organic metal compound in which n1=1 is greater than 0.5 in the organic metal compound shown by formula (I); and

[12] the solution for forming an organic thin film according to [11], wherein n1 is an integer of 1 to 4.

Further, the present invention relates to

[13] a method for producing a solution for forming an organic thin film, comprising a step of hydrolyzing and condensing at least one organic metal compound shown by formula (II)

(wherein R[3] represents a hydrocarbon group with 1 to 30 carbons optionally having a substituent, or a halogenated hydrocarbon group with 1 to 30 carbons optionally having a substituent;

M[2] represents at least one metal atom selected from the group consisting of Si, Ge, Sn, Ti and Zr;

X[5] represents a hydroxyl group or a hydrolysable group;

and m represents an integer of 1 to 3);

in an aliphatic ether solvent or an aliphatic ketone solvent, in the presence of water and acid;

[14] the production method according to [13], wherein the solution for forming an organic thin film is the solution for forming an organic thin film according to any one of [1] to [12];

[15] the method for producing a solution for forming an organic thin film according to [13] or [14], wherein the aliphatic ether solvent is tetrahydrofuran or tetrahydropyran;

[16] the method for producing a solution for forming an organic thin film according to any one of [13] to [15], wherein the pKa level of acid is 0 or less;

[17] the method for producing a solution for forming an organic thin film according to any one of [13] to [16], wherein the acid is a solid acid;

[18] the method for producing a solution for forming an organic thin film according to any one of [13] to [17], wherein the water level is 0.1 to 20 mol with respect to 1 mol of organic metal compound shown by formula (II);

[19] the method for producing a solution for forming an organic thin film according to any one of [13] to [18], comprising a step of mixing at least one solvent selected from the group consisting of hydrocarbon solvent, fluorine solvent and silicone solvent, after hydrolysis and condensation; and

[20] the method for producing a solution for forming an organic thin film according to [19], wherein the solvent is mixed so that the concentration of the hydrolytic condensate of the organic metal compound shown by formula (II) becomes 0.01 to 20 mass %.

Further, the present invention relates to

[21] an organic thin film obtained by allowing to contact the solution for forming an organic thin film according to any one of [1] to [12] to a substrate; and

[22] the organic thin film according to [21], wherein the organic thin film is a monomolecular thin film.

BRIEF EXPLANATION OF DRAWINGS

[FIG. 1]

It is a figure showing the results of GPC analysis of an ODS oligomer solution.

[FIG. 2]

It is a figure showing the results of reversed-phase HPLC analysis of an ODS oligomer solution.

DESCRIPTIONS OF EMBODIMENTS (1) Organic Metal Compound

The organic metal compounds used in the present invention include the following.

(1-1) Organic Metal Compounds Shown by Formula (I)

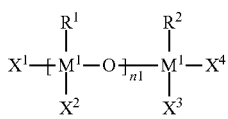

(I)

In the formula, $R^1$ and $R^2$ represent a hydrocarbon group with 1 to 30 carbons optionally having a substituent, or a halogenated hydrocarbon group with 1 to 30 carbons optionally having a substituent.

$X^1$, $X^2$, $X^3$ and $X^4$ each independently represents $R^1$, $R^2$, a hydroxyl group or a hydrolysable group. However, not all of $X^1$, $X^2$, $X^3$ and $X^4$ are $R^1$ or $R^2$. $X^1$, $X^2$, $X^3$ and $X^4$ are preferably a hydroxyl group or a hydrolysable group.

Each $R^1$ and each $X^2$ may be the same or different.

$X^1$ and $X^4$ may together form an oxygen atom, to form a ring wherein $M^1$ and oxygen atom are alternately bonded.

$M^1$ represents at least one tetravalent metal atom selected from the group consisting of Si, Ge, Sn, Ti and Zr.

n1 represents an integer of 1 or more, preferably an integer of 1 to 4.

Herein, the organic metal compound shown by formula (I) is a compound or a mixture of two or more compounds encompassed by formula (I), and at least one organic metal compound contains a hydroxyl group. Specifically, in the organic metal compound shown by formula (I), organic metal compounds with different types of substituent and having different number of n1 may be mixed. Further, organic metal compound not having a hydroxyl group may be contained. Organic metal compound not having a hydroxyl group is preferably 5 mass % or less.

The number of hydroxyl groups in one molecule of organic metal compound having a hydroxyl group is 1 or more, and preferably 2 or more.

At least one hydroxyl group should be contained in one molecule of organic metal compound having a hydroxyl group, because it is necessary for the binding with a substrate. However, as the hydroxyl group is also consumed when organic metal compounds condense, if all of the organic metal compounds having a hydroxyl group have only one hydroxyl group, the hydroxyl group cannot be bonded to the substrate, and the adhesion with the substrate becomes poor. Thus, when containing an organic metal compound with one hydroxyl group, it is preferred to be a mixture with a compound with 2 or more hydroxyl groups.

The organic metal compound shown by formula (I) may be a hydrolytic condensate of an organic metal compound shown by formula (II), as well as a compound produced by other known methods.

The definition of the substituents in formula (I) is as follows.

Examples of "hydrocarbon group with 1 to 30 carbons" of $R^1$ and $R^2$ include:

alkyl group such as methyl group, ethyl group, n-propyl group, isopropyl group, n-butyl group, isobutyl group, sec-butyl group, t-butyl group, n-pentyl group, isopentyl group, neopentyl group, t-pentyl group, n-hexyl group, isohexyl group, n-heptyl group, n-octyl group, n-decyl group, n-octadecyl group, etc.;

cycloalkyl group such as cyclopropyl group, cyclopentyl group, cyclohexyl group, etc.;

alkenyl group such as vinyl group, propenyl group, butenyl group, pentenyl group, n-decenyl group, n-octadecenyl group, etc.;

cycloalkenyl group such as 1-cyclobutenyl group, 2-cyclopentenyl group, 3-cyclohexenyl group, etc.;

alkynyl group such as ethynyl group, propynyl group, butynyl group, pentynyl group, n-decynyl group, n-octadecynyl group, etc.;

aryl group such as phenyl group, 1-naphthyl group, 2-naphthyl group, etc.; and arylalkyl group such as benzyl group, phenethyl group, 1-naphthylmethyl group, 2-naphthylmethyl group, etc.

A "halogenated hydrocarbon group with 1 to 30 carbons" of $R^1$ and $R^2$ means those in which a hydrogen atom in the above-mentioned hydrocarbon group with 1 to 30 carbons has been replaced by a halogen atom. Among these, a group wherein 2 or more hydrogen atoms in the alkyl group with 1 to 30 carbons has been replaced by a halogen atom is preferred.

Herein, a halogen atom means F, Cl, Br or I.

Examples of "substituent" in "optionally having a substituent" include:

carboxyl group; hydroxyl group; amino group; alkyl-substituted amino group such as methylamino group, ethylamino group, dimethylamino group, etc.;

alkylaminocarbonyl group such as methylaminocarbonyl group, dimethylaminocarbonyl group, ethylaminocarbonyl group, etc.;

alkoxy group such as methoxy group, ethoxy group, etc.;

aryloxy group such as phenoxy group, naphthoxy group, etc.;

alkylcarbonyl group such as methylcarbonyl group, ethylcarbonyl group, etc.;

alkylcarbonyloxy group such as methylcarbonyloxy group, ethylcarbonyloxy group, etc.;

arylcarbonyl group such as benzoyl group, naphthoyl group, etc.;

arylcarbonyloxy group such as phenylcarbonyloxy group, naphthylcarbonyloxy group, etc.;

alkoxycarbonyl group such as methoxycarbonyl group, ethoxycarbonyl group, etc.;

aryloxycarbonyl group such as phenoxycarbonyl group, naphthoxycarbonyl group, etc.;

alkylthio group such as methylthio group, ethylthio group, etc.;

alkylsulphinyl group such as methylsulphinyl group, ethylsulphinyl group, etc.;

alkylsulphonyl group such as methylsulphonyl group, ethylsulphonyl group, etc.;

arylthio group such as phenylthio group, naphthylthio group, etc.;

arylsulphinyl group such as phenylsulphinyl group, naphthylsulphinyl group, etc.;

arylsulphonyl group such as phenylsulphonyl group, naphthylsulphonyl group, etc.;

hetero cyclic group such as pyrrol-2-yl group, imidazol-2-yl group, pyrimidin-2-yl group, etc.;

and silyl group such as trimethylsilyl group, triethylsilyl group, etc. The number of these substituents is preferably 0 to 3.

Preferred examples of $R^1$ and $R^2$ include the following, but are not limited to these.

—Hydrocarbon Group $CH_3(CH_2)_9$—, $CH_3(CH_2)_{10}$—, $CH_3(CH_2)_{11}$—, $CH_3(CH_2)_{12}$—, $CH_3(CH_2)_{13}$—, $CH_3(CH_2)_{14}$—, $CH_3(CH_2)_{15}$—, $CH_3(CH_2)_{16}$—, $CH_3(CH_2)_{17}$—, $CH_3(CH_2)_{18}$—, $CH_3(CH_2)_{19}$—, $CH_3(CH_2)_{20}$—, $CH_3(CH_2)_{21}$—, $CH_3(CH_2)_{22}$—, $CH_3(CH_2)_{23}$—, $CH_3(CH_2)_{24}$—, $CH_3(CH_2)_{25}$—, etc.

—Halogenated Hydrocarbon Group $CF_3(CH_2)_2$—, $CF_3(CF_2)_3(CH_2)_2$—, $CF_3(CF_2)_5(CH_2)_2$—, $CF_3(CF_2)_7(CH_2)_2$—, $CF_3(CF_2)_7(CH_2)_2$—, etc.

$M^1$ represents one atom selected from the group consisting of Si, Ge, Sn, Ti and Zr. Among these, a silicon atom is particularly preferred from the viewpoint of easiness to obtain the raw material, reactivity etc.

$X^1$, $X^2$, $X^3$ and $X^4$ are the above $R^1$ or $R^2$, or represent a hydroxyl group or a hydrolysable group. The hydrolysable group is not particularly limited as long as it is a group that degrades by reacting with water. Examples include an alkoxy group with 1 to 6 carbons optionally having a substituent; acyloxy group optionally having a substituent; halogen atom such as F, Cl, Br, I, etc.; isocyanate group; cyano group; amino group; or amino group, etc.

Examples of alkoxy group with 1 to 6 carbons include methoxy group, ethoxy group, n-propoxy group, isopropoxy group, n-butoxy group, sec-butoxy group, t-butoxy group, n-pentyloxy group, n-hexyloxy group, etc.

Examples of acyloxy group include: alkylcarbonyloxy group with 1 to 6 carbons such as acetoxy group, propionyloxy group, n-propylcarbonyloxy group, isopropylcarbonyloxy group, n-butylcarbonyloxy group, etc.; arylcarbonyloxy group such as phenylcarbonyloxy group, naphthylcarbonyloxy group, etc.; and arylalkylcarbonyloxy group such as benzylcarbonyloxy group, phenethylcarbonyloxy group, etc.

Substituents thereof include carboxyl group, amido group, imido group, ester group, hydroxyl group, etc.

$X^1$, $X^2$, $X^3$, and $X^4$ are preferably hydroxyl group, alkoxy group with 1 to 4 carbons, acyloxy group, halogen atom, or isocyanate group, and more preferably an alkoxy group with 1 to 4 carbons or acyloxy group.

Examples of organic metal compound shown by formula (I) include a condensate obtained by a hydrolytic condensation of an organic metal compound shown by formula (II), and when $M^1$ is Si, the following can be exemplified as dimers and trimers.

(Dimer)

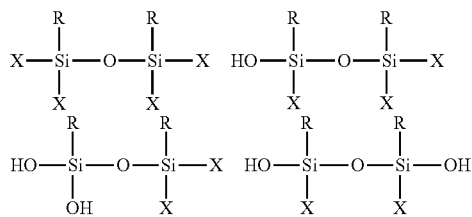

-continued

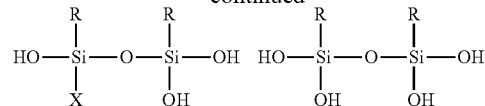

(wherein R represents $R^1$ or $R^2$, and X represents any one of $X^1$ to $X^4$. Further, X represents a group other than a hydroxyl group).

(Trimer)

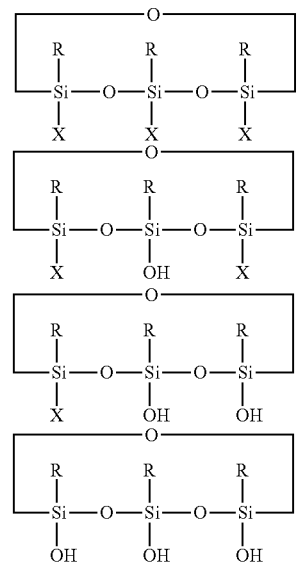

(wherein R and X have the same definition as in the above-mentioned dimer. In the present invention, as almost no chained trimer is contained, chained compounds are not described).

Here, the presence of organic metal compounds with different polymerization levels and their ratio can be obtained from, for example, the peak position and abundance ratio in GPC (gel permeation chromatography). Further, the presence of organic metal compounds with different numbers of OH group and their ratio can be obtained from, for example, the peak position and abundance ratio in HPLC (high-performance liquid chromatography).

Further, the hydrolysis degree can be obtained from the condensation degree by GPC, and the remaining ratio of hydrolysable group by NMR.

In organic metal compounds shown by formula (I), n1 is 1 or more, and preferably n1 is 1 to 4. Usually, compounds wherein n1 is greater than 4 are rarely detected.

Further, it is necessary that organic metal compounds shown by formula (I) have a condensation degree and hydrolysis degree that allow appropriate dissolution into a solvent. Therefore, the upper limit of the condensation degree and hydrolysis degree differ depending on the difference of organic metal compounds, solvent, etc.

Herein, "allow appropriate dissolution" means that it is dissolved to a level with which it can be used as a solution for forming an organic thin film, as when the condensation degree and hydrolysis degree increase, the hydrolytic condensate becomes insoluble into a dilution solvent, and thus difficult to be used as a solution for forming an organic thin film.

(1-2) Organic Metal Compound Shown by Formula (II)

In the formula, $R^3$ represents a hydrocarbon group with 1 to 30 carbons optionally having a substituent, or a halogenated hydrocarbon group with 1 to 30 carbons optionally having a substituent.

$M^2$ represents at least one metal atom selected from the group consisting of Si, Ge, Sn, Ti and Zr.

$X^5$ represents a hydroxyl group or a hydrolysable group.

m represents an integer of 1 to 3.

Examples of "hydrocarbon group with 1 to 30 carbons", "halogenated hydrocarbon group with 1 to 30 carbons", and "substituent" of $R^3$ include the same as for the above $R^1$ and $R^2$.

Examples of "hydrolysable group" of $X^5$ include the same as for the above $R^1$ and $R^2$.

m represents any integer of 1 to 3. When producing an organic thin film of high density, it is preferred that m is 1.

When in is 2 or more, each $R^3$ may be the same or different, and when (4−m) is 2 or more, each $X^5$ may be the same or different.

Specific examples of organic metal compounds shown by formula (II) include the following. In the following, compounds wherein $R^3$ is a hydrocarbon group and $M^2$ is Si are listed as representative examples, while the present invention is not limited to these.

$CH_3(CH_2)_9Si(OCH_3)_3$, $CH_3(CH_2)_{11}Si(OCH_3)_3$, $CH_3(CH_2)_{13}Si(OCH_3)_3$, $CH_3(CH_2)_{15}Si(OCH_3)_3$, $CH_3(CH_2)_{17}Si(OCH_3)_3$, $CH_3(CH_2)_{19}Si(OCH_3)_3$, $CH_3(CH_2)_{21}Si(OCH_3)_3$, $CH_3(CH_2)_{17}Si(OCH_2CH_3)_3$, $CH_3(CH_2)_{17}SiCl_3$, $CH_3(CH_2)_9Si(OCH_2CH_3)_3$, $CH_3(CH_2)_9SiCl_3$, $CH_3(CH_2)_9Si(CH_3)(OCH_2CH_3)_2$, $CH_3(CH_2)_9Si(CH_3)(OCH_3)_2$, $CH_3CH_2O(CH_2)_{15}Si(OCH_3)_3$, $CH_3(CH_2)_2Si(CH_3)_2(CH_2)_{15}Si(OCH_3)_3$, $CH_3(CH_2)_6Si(CH_3)_2(CH_2)_9Si(OCH_3)_3$, $CH_3COO(CH_2)_{15}Si(OCH_3)_3$, $CH_3CH_2O(CH_2)_{15}Si(OC_2H_5)_3$, $CH_3(CH_2)_2Si(CH_3)_2(CH_2)_{15}Si(OC_2H_5)_3$, $CH_3(CH_2)_6Si(CH_3)_2(CH_2)_9Si(OC_2H_5)_3$, $CH_3COO(CH_2)_{15}Si(OC_2H_5)_3$, $CH_3CH_2O(CH_2)_{15}Si(OCH_3)(OH)_2$, $CH_3(CH_2)_2Si(CH_3)_2(CH_2)_{15}Si(OCH_3)(OH)_2$, $CH_3(CH_2)_6Si(CH_3)_2(CH_2)_9Si(OCH_3)(OH)_2$, $CH_3COO(CH_2)_{15}Si(OCH_3)(OH)_2$, $CH_3CH_2O(CH_2)_{15}Si(OC_2H_5)(OH)_2$, $CH_3(CH_2)_2Si(CH_3)_2(CH_2)_{15}Si(OC_2H_5)(OH)_2$, $CH_3(CH_2)_6Si(CH_3)_2(CH_2)_9Si(OC_2H_5)(OH)_2$, $CH_3COO(CH_2)_{15}Si(OC_2H_5)(OH)_2$, $CH_3CH_2O(CH_2)_{15}Si(OCH_3)_2(OH)$, $CH_3(CH_2)_2Si(CH_3)_2(CH_2)_{15}Si(OCH_3)_2(OH)$, $CH_3(CH_2)_6Si(CH_3)_2(CH_2)_9Si(OCH_3)_2(OH)$, $CH_3COO(CH_2)_{15}Si(OCH_3)_2(OH)$, $CH_3CH_2O(CH_2)_{15}Si(OC_2H_5)_2(OH)$, $CH_3(CH_2)_2Si(CH_3)_2(CH_2)_{15}Si(OC_2H_5)_2(OH)$, $CH_3(CH_2)_6Si(CH_3)_2(CH_2)_9Si(OC_2H_5)_2(OH)$, $CH_3COO(CH_2)_{15}Si(OC_2H_5)_2(OH)$, $CH_3CH_2O(CH_2)_{15}Si(OH)_3$, $CH_3(CH_2)_2Si(CH_3)_2(CH_2)_{15}Si(OH)_3$, $CH_3(CH_2)_6Si(CH_3)_2(CH_2)_9Si(OH)_3$, $CH_3COO(CH_2)_{15}Si(OH)_3$, $CH_3CH_2O(CH_2)_{15}Si(OH)_3$, $CH_3(CH_2)_2Si(CH_3)_2(CH_2)_{15}Si(OH)_3$, $CH_3(CH_2)_6Si(CH_3)_2(CH_2)_9Si(OH)_3$, $CH_3COO(CH_2)_{15}Si(OH)_3$, $CH_3(CH_2)_9Si(NCO)_3$, $CH_3(CH_2)_{10}Si(NCO)_3$, $CH_3(CH_2)_{11}Si(NCO)_3$, etc.

The above can be exemplified, while the compound is not limited to these.

Further, these compounds may be used alone or by combining 2 or more of these.

(1-3) Organic Metal Compound Shown by Formula (III)

Formula (III)

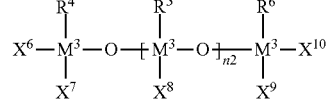

In the formula, $R^4$, $R^5$ and $R^6$ each independently represent a hydrocarbon group with 1 to 30 carbons optionally having a substituent, or a halogenated hydrocarbon group with 1 to 30 carbons optionally having a substituent.

$X^6$, $X^7$, $X^8$, $X^9$ and $X^{10}$ each independently represent any one of $R^4$ to $R^6$, a hydroxyl group or a hydrolysable group. However, not all of $X^6$, $X^7$, $X^8$, $X^9$ and $X^{10}$ are any one of $R^4$ to $R^6$, and at least one of $X^6$, $X^7$, $X^8$, $X^9$ and $X^{10}$ represents a hydroxyl group, and at least one of them represents a hydrolysable group.

All of $X^6$, $X^7$, $X^8$, $X^9$ and $X^{10}$ are preferably a hydroxyl group or a hydrolysable group.

When n2 is 2 or more, each $R^5$ and each $X^8$ may be the same or different.

$M^2$ represents at least one metal atom selected from the group consisting of Si, Ge, Sn, Ti and Zr.

n2 represents 0 or an integer of 1 or more, preferably an integer of 0 to 3.

The organic metal compound shown by formula (III) a chained compound among the organic metal compounds shown by formula (I), and at least one of $X^6$, $X^7$, $X^8$, $X^9$ and $X^{10}$ is a hydroxyl group, and at least one of them is a hydrolysable group. Specifically, a compound wherein all of $X^6$, $X^7$, $X^8$, $X^9$ and $X^{10}$ are hydroxyl groups or all of $X^6$, $X^7$, $X^8$, $X^9$ and $X^{10}$ are hydrolysable groups is not encompassed.

Examples of "hydrocarbon group with 1 to 30 carbons", "halogenated hydrocarbon group with 1 to 30 carbons", and "substituent" of $R^4$, $R^5$ and $R^6$ include the same as for the above $R^1$ and $R^2$.

Examples of "hydrolysable groups" of $X^6$, $X^7$, $X^8$, $X^9$ and $X^{10}$ include the same as for the above $R^1$ and $R^2$.

Examples of organic compounds shown by formula (III) include the following, for example, when $M^3$ is Si.

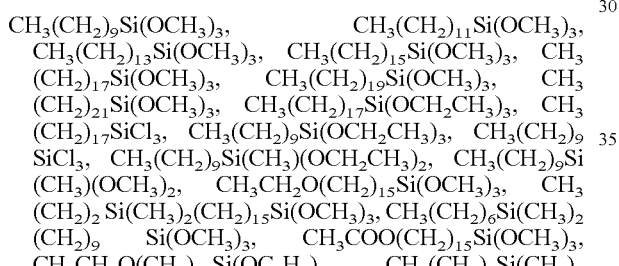

(wherein R represents any one of $R^4$ to $R^6$, X represents any one of $X^6$ to $X^{10}$; further, X represents a group other than a hydroxyl group).

(1-4) Cyclic Organic Metal Compound Shown by Formula (IV)

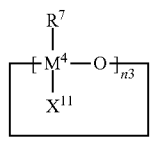

(IV)

In the formula, $R^7$ represents a hydrocarbon group with 1 to 30 carbons optionally having a substituent, or a halogenated hydrocarbon group with 1 to 30 carbons optionally having a substituent.

$X^{11}$ represents $R^7$, a hydroxyl group or a hydrolysable group. However, not all of $X^{11}$ are $R^7$, and at least one of $X^{11}$ represents a hydroxyl group, and at least one of $X^{11}$ represents a hydrolysable group. All of $X^{11}$ are preferably a hydroxyl group or a hydrolysable group.

Each $R^7$ and each $X^{11}$ may be the same or different.

$M^4$ represents at least one metal atom selected from the group consisting of Si, Ge, Sn, Ti and Zr.

n3 represents an integer of 2 or more, and preferably an integer of 2 to 5.

The organic metal compounds shown by formula (IV) represents a cyclic compound among the organic metal compounds shown by formula (I), in which at least one of $X^{11}$ represents a hydroxyl group, and at least one of $X^{11}$ represents a hydrolysable group. Specifically, a compound wherein all of $X^{11}$ are hydroxyl group, or all of $X^{11}$ are hydrolysable group is not encompassed.

Examples of "hydrocarbon group with 1 to 30 carbons", "halogenated hydrocarbon group with 1 to 30 carbons", and "substituent" of $R^7$ include the same as for the above $R^1$ and $R^2$.

Examples of "hydrolysable groups" of $X^{11}$ include the same as for the above $R^1$ and $R^2$.

Examples of organic compounds shown by formula (IV) include the following, for example, when $M^4$ is Si.

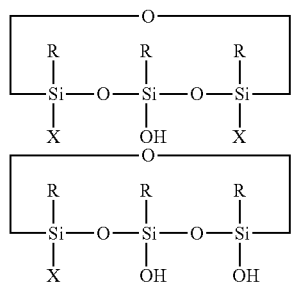

(wherein R represents $R^7$, and X represents $X^{11}$; further, X represents a group other than a hydroxyl group).

(2) Method for Producing an Organic Metal Compound Shown by Formula (I), Formula (III) or Formula (IV)

The organic metal compound shown by formula (I), formula (III) or formula (IV) mentioned in the above can be produced by a known method, while it is preferably produced by the following method.

Specifically, a method of allowing the organic metal compound shown by formula (II) to hydrolyze and condense in a solvent and in the presence of water and acid catalyst can be exemplified.

Examples of acid catalysts include mineral acids such as hydrochloric acid, sulfuric acid, nitric acid, hydroiodic acid, hydrobromic acid, etc.; organic acids such as trifluoroacetic acid, p-toluenesulfonic acid, methanesulfonic acid, etc., preferably acid of pKa≤0, as well as solid acids that do not dissolve in a solvent, such as perfluorosulfonic acid/PTFE copolymer ($H^+$ type) (for example, Nafion NR50 (registered trademark) (DuPont)), polystyrene sulfonic acid (for example, AMBERLYST 15 (registered trademark) (Rohm and Haas)), etc. Particularly, solid acids are preferred as they can be easily removed from the solvent by filtration, etc.

The used amount of mineral acids and organic acids is not particularly limited as long as it does not affect the properties of the organic metal thin film to be formed, and it is used in an amount of 0.01 mmol to 1 mol with respect to 1 mol of organic metal compound. On the other hand, the used amount of solid acid is not particularly limited as long as it does not affect the properties of the organic metal thin film to be formed, and it is used in an amount of 0.05 to 20 mass % with respect to the organic metal compound.

The solvent used at the time of hydrolytic condensation is not particularly limited as long as the condensate of the present invention can be produced. Particularly, aliphatic ether such as tetrahydrofuran (THF), tetrahydropyran (THP), cyclopentylmethylether, 1,2-diethoxyethane, etc.; or aliphatic ketone such as methylisobutylketone is preferred. Among these, alicyclic ether is preferred, and tetrahydrofuran (THF) or tetrahydropyran (THP) is particularly preferred. The used amount is not particularly limited, but usually it is used in an amount of 10 to 99 mass % in the total amount of the reaction solution. As for the solvent to be used, if the condensate precipitates without being dissolved, it cannot be used as a solution for forming an organic thin film, therefore it is necessary to select a solvent that can bring the condensate into an adequately dissolved state.

As for the used amount of water, it is used in an amount of 0.1 mol to 20 mol with respect to 1 mol of organic metal compound shown by formula (II), preferably 0.5 mol to 6 mol, and more preferably 1 to 4 mol. When the used amount of water is too large, the hydrolysis and condensation of the organic metal compound shown by formula (II) progress, and precipitates by being gelatinized. Thus, it is preferred that the used amount of water is as small as possible.

The reaction temperature differs depending on the solvent, and is 0 to the boiling point of the solvent (65° C., in case of THF). The reaction time differs depending on the purpose, and is 1 hour to 100 days. When the reaction time is short, the remaining level of the unreacted organic metal is large, and the amount of trimer or higher would be larger as compared to that of dimer. When the reaction time becomes longer, unreacted organic metal compounds disappear, and condensates of trimers or higher becomes the main ingredients.

Method for preparing the condensate of the present invention include, besides the above method, a method of first producing unhydrolyzed condensate using alkaline catalyst, etc. and then performing hydrolysis by an acid catalyst, etc.

The condensation degree of the obtained condensate increases over the course of the reaction time. Specifically, at the early phase of the reaction, unreacted organic metal compound remains, and the amount of dimer is larger as compared to that of trimer. Subsequently, over the course of time, almost all of unreacted organic metal compounds disappear, and dimers decrease, and condensates of trimers or higher increase. Herein, almost all of the condensates of trimers or higher are cyclic.

(3) Solution for Forming an Organic Thin Film Comprising an Organic Metal Compound A solution for forming an organic thin film is a solution prepared so that it can be in contact with a substrate, and it is related to a solution wherein an organic metal compound is contained in a solvent.

The solution for forming an organic thin film of the present invention includes the following i) to iii).

i) Solution for Forming an Organic Thin Film Comprising a Certain Amount or More of an Organic Metal Compound Shown by Formula (I)

Usually, as an organic metal compound shown by formula (I) is produced from an organic metal compound shown by formula (II), unreacted organic metal compound shown by formula (II), etc. may be present in the solvent. However, it is preferred to reduce as much as possible the organic metal compound shown by formula (II) in order to produce a suitable organic thin film.

Specifically, it is prepared so that it becomes as follows, with respect to the total amount of the (A) organic metal compound shown by formula (I) and the (B) organic metal compound shown by formula (II): 40 mass %≤organic metal compound shown by formula (I)≤100 mass % (i.e., 40≤[(A)/{(A)+(B)}]×100≤100 (mass %)), 0≤organic metal compound shown by formula (II)≤60 mass % (i.e., 0≤[(B)/{(A)+(B)}]×100≤60 (mass %)), preferably 50 mass %≤organic metal compound shown by formula (I)≤100 mass % (i.e., 50≤[(A)/{(A)+(B)}]×100≤100 (mass %)), 0≤organic metal compound shown by formula (II)≤50 mass % (i.e., 0≤[(B)/{(A)+(B)}]×100≤50 (mass %)), more preferably 70 mass %≤organic metal compound shown by formula (I)≤100 mass % (i.e., 70≤[(A)/{(A)+(B)}]×100≤100 (mass %)), 0≤organic metal compound shown by formula (II)≤30 mass % (i.e., 0≤[(B)/{(A)+(B)}]×100≤30 (mass %)).

In the solution for forming an organic thin film of the present invention, the compound shown by formula (I) is the essential ingredient, and the compound shown by formula (I) is the ingredient forming the organic thin film per se (active ingredient for forming the film). Due to the presence of the compound of formula (I), a dense monomolecular film or organic thin film with less impurity can be formed rapidly.

Further, in the solution for forming an organic thin film of the present invention, it is preferred that the mass ratio of the organic metal compound in which $n1=2$ (i.e., trimer) with respect to the organic metal compound in which $n1=1$ (i.e., dimer) in the organic metal compound shown by formula (I) is greater than 0.5. The mass ratio has no upper limit, as a suitable film forming is possible even when there are only trimers or higher, and almost no dimer.

Further, the solution for forming an organic thin film is preferred to contain at least one compound selected from the group consisting of organic metal compounds shown by formula (III) and organic metal compounds shown by formula (IV). In that case, the total amount of organic metal compound shown by formula (III) and cyclic organic metal compound shown by formula (IV) is 5 to 98 mass %, preferably 30 to 95 mass % with respect to the total organic metal compounds.

ii) Solution for Forming an Organic Thin Film Comprising an Organic Metal Compound Shown by Formula (III) or Formula (IV)

By using a solution for forming an organic thin film comprising an organic metal compound shown by formula (III) or formula (IV), specifically an organic metal compound containing both a hydroxyl group and a hydrolysable group in one molecule of a compound, a suitable organic thin film can be prepared regardless of the above section i).

In the organic metal compound shown by formula (I), the total amount of an organic metal compound shown by formula (III) and a cyclic organic metal compound shown by formula (IV) is usually 5 to 98 mass %, preferably 30 to 95 mass %.

Further, in the total amount of organic metal compounds shown by formula (III) and formula (IV), it is preferred that the cyclic organic metal compound shown by formula (IV) is the main ingredient.

iii) Solution for Forming an Organic Thin Film Wherein the Mass Ratio of the Organic Metal Compound in which $n1=2$ with Respect to the Organic Metal Compound in which $n1=1$ is Greater than 0.5 in the Organic Metal Compound Shown by Formula (I)

When comprising an organic metal compound shown by formula (I), by making the mass ratio of the organic metal compound in which $n1=2$ with respect to the organic metal compound in which $n1=1$ greater than 0.5, a suitable organic thin film can be prepared regardless of the above section i).

(4) Preparation of a Solution for Forming an Organic Thin Film

The solution for forming an organic thin film of the present invention can be prepared by allowing the solvent to contain the above organic metal compound, and when the organic metal compound of the present invention has been produced according to the method described in the above (2), the solution for forming an organic thin film is prepared by further stirring and mixing the above-mentioned solution comprising the organic metal compound with an organic solvent.

The final total amount of the organic metal compound contained in the solution for forming an organic thin film is 0.01 to 20 mass %, preferably 0.1 to 5 mass %.

Examples of organic solvent used for preparing a solution for forming an organic thin film include hydrocarbon solvent, fluorocarbon solvent and silicone solvent. Hydrocarbon solvent is preferred and a hydrocarbon solvent with a boiling point of 100 to 250° C. is particularly preferred.

Specific examples include:

hydrocarbon solvent such as n-hexane, cyclohexane, benzene, toluene, xylene, Sorbesso 150 (Exxon Mobil), petroleum naphtha, solvent naphtha, petroleum ether, petroleum benzine, isoparaffin, normal paraffin, decalin, industrial gasoline, kerosene, ligroin, etc.; chlorofluorocarbon solvent such as $CBr_2ClCF_3$, $CClF_2CF_2CCl_3$, $CClF_2CF_2CHFCl$, $CF_3CF_2CHCl_2$, $CF_3CBrFCBrF_2$, $CClF_2CClFCF_2CCl_3$, $Cl(CF_2CFCl)_2Cl$, $Cl(CF_2CFCl)_2CF_2CCl_3$, $Cl(CF_2CFCl)_3Cl$, etc.; fluorocarbon solvent such as Fluorinert (Sumitomo 3M Limited, registered trademark), Afulude (Asahi Glass Co., Ltd.), etc.; fluorine solvent such as Novec HFE7200, Novec HFE7300, Novec HFE7600 (Sumitomo 3M Limited; registered trademark), etc.; and silicone solvent such as dimethyl silicone, phenyl silicone, alkyl-modified silicone, polyether silicone, etc. These solvents may be used alone or by combining 2 or more of these.

The temperature for stirring a mixture is usually −100° C. to +100° C., preferably −20° C. to +50° C. The stirring time is usually from several minutes to several hours.

In this case, it is also preferred to perform an ultrasonic treatment, in order to obtain a uniform solution for forming an organic thin film.

Precipitates containing metal oxides, etc. sometimes generate in the prepared solution for forming an organic thin film. It is preferred to remove theses impurities such as precipitates, etc. at this stage, in order to obtain a dense monomolecular organic thin film without impurities. The precipitates can be easily removed by operations including filtration and decanting.

The solution for forming an organic thin film of the present invention has an excellent storage stability, and an excellent organic thin film can be formed even after a tight seal storage for 40 to 60 days at room temperature (20° C. to 30° C.).

(5) Production of Organic Thin Film

The organic thin film of the present invention can be produced on a substrate surface, by allowing the substrate to contact the solution for forming an organic thin film obtained as in the above.

As a substrate to be used, a substrate having an active hydrogen on the surface is preferred. Specifically, substrates made of metal such as aluminum, copper, nickel, stainless, etc.; silicon; ceramics; glass; plastic; paper; natural fiber or synthetic fiber; leather; and other hydrophilic materials can be exemplified.

When a substrate that does not have a hydroxyl group or the like on the surface is used, it is also possible to treat the substrate surface previously in a plasma atmosphere containing oxygen, or to introduce a hydrophilic group by a corona treatment. The hydrophilic group is preferably a hydroxyl group (—OH), but may be a functional group having an active hydrogen, such as —COOH, —CHO, =NH, —$NH_2$, etc.

Further, when a substrate that does not have an active hydrogen on the surface is used, it is also possible to allow the substrate surface to contact previously with $Si(OR)_4$ or its hydrolytic condensate, and then conducting a dealcohol reaction according to need, or allowing to contact $SiCl_4$, $SiHCl_3$, $SiH_2Cl_2$ or Cl—$(SiCl_2O)_c$—$SiCl_3$ (wherein c is 0 or a positive integer), and then to conduct a dehydrochlorination reaction to form a silica basic layer having an active hydrogen on the surface.

The method to allow the substrate surface to contact with the solution for forming an organic thin film of the present invention is not particularly limited, and a known method can be used. Specific examples include, dipping method, spin coating method, spraying method, roller coat method, Mayer bar method, screen printing method, and brush coating method. Among these, dipping method is preferred.

The contact temperature of the solution for forming an organic thin film of the present invention and the substrate surface is not particularly limited as long as it is a temperature range within which the solution of the present invention can maintain stability. Usually, it may be performed within the range from room temperature to the reflux temperature of the solvent used for preparing the solution. In order to obtain a suitable temperature for contact, the solution for forming an organic thin film of the present invention may be heated, or the substrate itself may be heated.

Further, ultrasonic waves may be used to promote film formation. The step of allowing the substrate surface to contact with the solution for forming an organic thin film of the present invention may be conducted at one time for a long time, or a brief coating may be conducted several times.

After allowing the substrate surface to contact with the solution for forming an organic thin film of the present invention, a washing step may be provided in order to remove extra reagent, impurities, etc. attached to the film surface. By providing a washing step, the film thickness can be more controlled. The washing method is not particularly limited as long it is a method by which the attached materials on the surface can be removed. Specifically, a method of immersing a substrate in a solvent that may dissolve the used organic metal compound; a method of allowing evaporation in the atmosphere by leaving stand in vacuum or under ordinary pressure; a method of blowing off by spraying inactive gas such as dried nitrogen gas, can be exemplified.

It is preferred to heat the substrate after allowing the substrate to contact with the solution for forming an organic thin film of the present invention, or washing the substrate, in order to stabilize the film formed on the substrate surface. The heating temperature may be appropriately selected according to the substrate, or stability of the formed organic thin film, etc.

(6) Organic Thin Film

When the solution for forming an organic thin film of the present invention is allowed to contact on a substrate, the organic metal compound in the solution for forming an organic thin film is adsorbed on the substrate surface, and a thin film is formed. The mechanism by which the organic metal compound is adsorbed on the substrate surface can be considered as follows when it is a case of a substrate having an active hydrogen on the surface. Specifically, the OH group in the organic metal compound reacts with the active hydrogen on the substrate surface, and a thin film is formed by forming a strong chemical bond with the substrate. The thin film becomes a monomolecular film.

The present invention can be used advantageously particularly in the production of a monomolecular film. Further, it can be used as a method for forming a film on the surface, by a physical adsorption.

The organic thin film formed by the present invention is not particularly limited, while it is preferred to be a crystalline organic thin film. The crystalline property of the organic thin film formed by the present invention can be confirmed by measuring the film with a thin film X-ray diffraction device.

The film thickness of the organic thin film formed by the present invention is almost the same as the chain length of R of formula (I) in the case of monomolecular film.

The organic thin film formed by the present invention is preferably a chemisorbed film, and it is more preferred that the substrate does not have a crystalline property and the chemisorbed film has a crystalline property. In that case, the crystalline property may be multicrystal, or monocrystal. As a chemisorbed film, an organic thin film covalently bonds via metal-oxygen bond can be exemplified.

The organic thin film formed by the present invention is preferred to be a self-assembled film. Herein, a self-assembled film relates to a film having a methodical structure without external forcing.

As it is stated in the above, by using the solution for forming an organic thin film of the present invention, a dense organic thin film with less impurity can be formed at a higher speed as compared to the conventional solution regardless of the type of substrate. Such organic thin films are used for forming design pattern of electric devices, etc. and can be very easily applied for equipments which require a heat-resistant, weather-resistant, and abrasion-resistant ultra thin film coating, such as electronics products, particularly electrical appliances, car, industrial devices, mirror, optical lenses, etc. Further, it is also useful as mold lubricant for a mold, etc.

EXAMPLES

The present invention will be further explained in detail in the following by referring to the Examples, while the present invention will not be limited to the following Examples. In the Examples, ODS denotes octadecyltrimethoxysilane, HDS denotes hexadecyltrimethoxysilane, FAS-9 denotes $CF_3$—$C_3F_6$—$C_2H_4$—Si(OMe) and FAS-13 denotes $CF_3$—$C_5F_{10}$—$C_2H_4$—$Si(OMe)_3$. Further, THF denotes tetrahydrofuran, and THP denotes tetrahydropyran. Further, oligomers relates to organic metal compounds shown by formula (I), (III) or (IV).

I. Preparation of a Solution for Forming an Organic Thin Film
A. Example of a Solution for Forming an Organic Thin Film Using ODS as Raw Material
A-1 Example of Using Inorganic Acid as Catalyst

Example 1

Reaction Time: 2 Days

1) Synthesis of Oligomer Solution 8.1 g (20 mmol) of ODS (Gelest; purity 95%) was put in a 100 ml-four neck-flask at room temperature, which was diluted by adding 41.2 g of THF. 0.53 g (29 mmol) of pure water and 0.20 g of 0.1 N hydrochloric acid (hydrogen chloride 0.02 mmol, water 11 mmol) were added to the solution and stirred. An oligomer solution was obtained by reacting the solution at room temperature for 2 days. The results of GPC analysis of the oligomer solution were: monomer: 6.9%; dimer: 27.6%; trimer: 43.1%; tetramer or higher: 22.4% (relative area ratio).

2) Preparation of a Solution for Forming a Thin Film 960 g of toluene was put in a 1000 ml-four neck-flask at room temperature, 40 g of the oligomer solution was added and stirred, and a uniform solution for forming an organic thin film A was obtained.

Example 2

Reaction Time: 18 Days

1) Synthesis of Oligomer Solution 8.1 g (20 mmol) of ODS (Gelest; purity 95%) was put in a 100 ml-four neck-flask at room temperature, which was diluted by adding 41.2 g of THF. 0.53 g (29 mmol) of pure water and 0.20 g of 0.1N hydrochloric acid (hydrogen chloride 0.02 mmol, water 11 mmol) were added to the solution and stirred. An oligomer solution was obtained by reacting the solution at room temperature for 18 days. The results of GPC analysis of the oligomer solution were: monomer: 0%; dimer: 9.5%; trimer: 46.6%; tetramer or higher: 43.9% (relative area ratio).

2) Preparation of a Solution for Forming a Thin Film 960 g of toluene was put in a 1000 ml-four neck-flask at room temperature, 40 g of the oligomer solution was added and stirred, and a uniform solution for forming an organic thin film B was obtained.

Example 3

Example in which the Solvent in Step 2) of Example 1 has been Changed from Toluene to Sorbesso 960 g of Sorbesso 150 (Exxon Mobil) was put in a 1000 ml-four neck-flask at room temperature, 40 g of an oligomer solution prepared similarly as Example 1-2) was added and stirred, and a uniform solution for forming an organic thin film C was obtained.

Example 4

Water Increased; Reaction Time: 2 Days

1) Synthesis of Oligomer Solution 8.1 g (20 mmol) of ODS (Gelest; purity 95%) was put in a 100 ml-four neck-flask at room temperature, which was diluted by adding 40.8 g of THF. 0.90 g (49 mmol) of pure water and 0.20 g of 0.1N hydrochloric acid (hydrogen chloride 0.02 mmol, water 11 mmol) were added to the solution and stirred. An oligomer solution was obtained by reacting the solution at room temperature for 2 days. The results of GPC analysis of the oligomer solution were: monomer: 0.5%; dimer: 16.9%; trimer: 50.0%; tetramer or higher: 32.6% (relative area ratio).

2) Preparation of a Solution for Forming a Thin Film 960 g of toluene was put in a 1000 ml-four neck-flask at room temperature, 40 g of the oligomer solution was added and stirred, and a uniform solution for forming an organic thin film D was obtained.

Example 5

Using THP as Reaction Solvent; Reaction Time: 3 Days

1) Synthesis of Oligomer Solution 8.1 g (20 mmol) of ODS (Gelest; purity 95%) was put in a 100 ml-four neck-flask at room temperature, which was diluted by adding 41.2 g of THP. 0.53 g (29 mmol) of pure water and 0.20 g of 0.1N hydrochloric acid (hydrogen chloride 0.02 mmol, water 11 mmol) were added to the solution and stirred. An oligomer solution was obtained by reacting the solution at room temperature for 3 days. The results of GPC analysis of the oligomer solution were: monomer: 2.2%; dimer: 14.6%; trimer: 42.4%; tetramer or higher: 40.8% (relative area ratio).

2) Preparation of a Solution for Forming a Thin Film 960 g of Sorbesso 150 (Exxon Mobil) was put in a 1000 ml-four neck-flask at room temperature, 40 g of the oligomer solution was added and stirred, and a uniform solution for forming an organic thin film E was obtained.

Example 6

Using Sulfuric Acid

1) Synthesis of Oligomer Solution 8.1 g (20 mmol) of ODS (Gelest; purity 95%) was put in a 100 ml-four neck-flask at room temperature, which was diluted by adding 41.2 g of THF. 0.63 g (35 mmol) of pure water and 0.10 g of 0.1N sulfuric acid (sulfuric acid 0.01 mmol, water 5 mmol) were added to the solution and stirred. An oligomer solution was obtained by reacting the solution at room temperature for 3 days. The results of GPC analysis of the oligomer solution were: monomer: 0%; dimer: 10.9%; trimer: 46.9%; tetramer or higher: 42.2% (relative area ratio).

2) Preparation of a Solution for Forming a Thin Film 960 g of Sorbesso 150 (Exxon Mobil) was put in a 1000 ml-four neck-flask at room temperature, 40 g of the oligomer solution was added and stirred, and a uniform solution for forming an organic thin film F was obtained.

A-2 Example of Using Organic Acid as Catalyst

Example 7

Using p-Toluenesulfonic Acid

1) Synthesis of Oligomer Solution 8.1 g (20 mmol) of ODS (Gelest; purity 95%) was put in a 100 ml-four neck-flask at room temperature, which was diluted by adding 41.2 g of THF. 0.63 g (35 mmol) of pure water and 0.10 g of 0.1N p-toluenesulfonic acid (p-toluenesulfonic acid 0.01 mmol, water 5 mmol) were added to the solution and stirred. An oligomer solution was obtained by reacting the solution at room temperature for 3 days. The results of GPC analysis of the oligomer solution were: monomer: 0%; dimer: 11.5%; trimer: 48.9%; tetramer or higher: 39.7% (relative area ratio).

2) Preparation of a Solution for Forming a Thin Film 960 g of Sorbesso 150 (Exxon Mobil) was put in a 1000 ml-four neck-flask at room temperature, 40 g of the oligomer solution was added and stirred, and a uniform solution for forming an organic thin film G was obtained.

Example 8

Using Trifluoroacetic Acid

1) Synthesis of Oligomer Solution 8.1 g (20 mmol) of ODS (Gelest; purity 95%) was put in a 100 ml-four neck-flask at room temperature, which was diluted by adding 41.2 g of THF. 0.53 g (30 mmol) of pure water and 0.20 g of 0.1N trifluoroacetic acid (trifluoroacetic acid 0.02 mmol, water 10 mmol) were added to the solution and stirred. An oligomer solution was obtained by reacting the solution at room temperature for 27 days. The results of GPC analysis of the oligomer solution were: monomer: 10.5%; dimer: 6.1%; trimer: 42.0%; tetramer or higher: 41.5% (relative area ratio).

2) Preparation of a Solution for Forming a Thin Film 960 g of Sorbesso 150 (Exxon Mobil) was put in a 1000 ml-four neck-flask at room temperature, 40 g of the oligomer solution was added and stirred, and a uniform solution for forming an organic thin film H was obtained.

A-3 Example of Using Solid Acid as Catalyst

Example 9

Reaction Time: 4 Days

1) Synthesis of Oligomer Solution 8.1 g (20 mmol) of ODS (Gelest; purity 95%) was put in a 100 ml-four neck-flask at room temperature, which was diluted by adding 41.2 g of THF. 0.72 g (40 mmol) of pure water and 0.20 g of Nafion (registered trademark; DuPont, perfluorosulfonic acid/PTFE copolymer ($H^+$ type)) were added to the solution and stirred. An oligomer solution was obtained by reacting the solution at room temperature for 4 days. The results of GPC analysis of the oligomer solution were: monomer: 0%; dimer: 18.2%; trimer: 48.7%; tetramer or higher: 33.1% (relative area ratio).

2) Preparation of a Solution for Forming a Thin Film 960 g of toluene was put in a 1000 ml-four neck-flask at room temperature, 40 g of the filtrate of the oligomer solution from which. Nafion was removed by filtration was added and stirred, and a uniform solution for forming an organic thin film I was obtained.

Example with Different Oligomer Concentration

Example 10-1

Reaction Time: 55 Days; Standard Concentration

1) Synthesis of Oligomer Solution 8.1 g (20 mmol) of ODS (Gelest; purity 95%) was put in a 100 ml-four neck-flask at room temperature, which was diluted by adding 41.2 g of THF. 0.53 g (29 mmol) of pure water and 0.20 g of 0.05N hydrochloric acid (hydrogen chloride 0.01 mmol, water 11 mmol) were added to the solution and stirred. An oligomer solution was obtained by reacting the solution at room temperature for 55 days. The results of GPC analysis of the oligomer solution were: monomer: 0%; dimer: 9.3%; trimer: 46.6%; tetramer or higher: 44.1% (relative area ratio).

2) Preparation of a Solution for Forming a Thin Film 480 g of Sorbesso 150 (Exxon Mobil) was put in a 1000 ml-four neck-flask at room temperature, 20 g of the oligomer solution was added and stirred, and a uniform solution for forming an organic thin film J-1 was obtained.

Example 10-2

Standard Concentration×¼

495 g of Sorbesso 150 (Exxon Mobil) was put in a 1000 ml-four neck-flask at room temperature, 5 g of the oligomer solution obtained in step 1) of Example 10-1 was added and stirred, and a uniform solution for forming an organic thin film J-2 was obtained.

Example 10-3

Standard Concentration×¹⁄₁₀

495 g of Sorbesso 150 (Exxon Mobil) was put in a 1000 ml-four neck-flask at room temperature, 2 g of the oligomer solution obtained in step 1) of Example 10-1 was added and stirred, and a uniform solution for forming an organic thin film J-3 was obtained.

A-5 Example of Long Storage

Example 11-1

Standard; Reaction Time: 18 Days

1) Synthesis of Oligomer Solution 8.1 g (20 mmol) of ODS (Gelest; purity 95%) was put in a 100 ml-four neck-flask at room temperature, which was diluted by adding 41.2 g of THF. 0.53 g (2.9 mmol) of pure water and 0.20 g of 0.1N hydrochloric acid (hydrogen chloride 0.02 mmol, water 11 mmol) were added to the solution and stirred. An oligomer solution was obtained by reacting the solution at room temperature for 18 days. The results of GPC analysis of the oligomer solution were: monomer: 0%; dimer: 9.5%; trimer: 46.6%; tetramer or higher: 43.9% (relative area ratio).

2) Preparation of Solution for Forming a Thin Film 960 g of Sorbesso 150 (Exxon Mobil) was put in a 1000 ml-four neck-flask at room temperature, 40 g of the oligomer solution was added and stirred, and a uniform solution for forming an organic thin film K-1 was obtained.

Example 11-2

One Month Storage

The solution for forming an organic thin film K-1 obtained in Example 11-1 was stored in a thermoneutral environment in a high density polyethylene container for 1 month, to obtain a uniform solution for forming an organic thin film K-2.

A-6 Example in which the Reaction Solvent has been Changed

Example 12

Using Methyl Isobutyl Ketone as Reaction Solvent

1) Synthesis of Oligomer Solution 8.1 g (20 mmol) of ODS (Gelest; purity 95%) was put in a 100 ml-four neck-flask at room temperature, which was diluted by adding 41.2 g of methyl isobutyl ketone. 0.53 g (29 mmol) of pure water and 0.20 g of 0.1N hydrochloric acid (hydrogen chloride 0.02 mmol, water 11 mmol) were added to the solution and stirred. The solution was allowed to react at room temperature for 1 day.

This reaction solution was not a uniform solution and was in a slurry state containing insoluble crystals. The results of GPC analysis were: monomer: 10%; dimer: 33%; trimer: 42%; tetramer or higher: 16% (relative area ratio).

2) Preparation of a Solution for Forming a Thin Film 960 g of toluene was put in a 1000 ml-four neck-flask at room temperature, and 40 g of the slurry solution was added and stirred, to prepare a solution for forming an organic thin film L. This solution was a non-uniform solution containing insoluble matters.

Example 13

Using Cyclopentyl Methyl Ether as Reaction Solvent

1) Synthesis of Oligomer Solution 8.1 g (20 mmol) of ODS (Gelest; purity 95%) was put in a 100 ml-four neck-flask at room temperature, which was diluted by adding 41.2 g of cyclopentyl methyl ether. 0.53 g (29 mmol) of pure water and 0.20 g of 0.1N hydrochloric acid (hydrogen chloride 0.02 mmol, water 11 mmol) were added to the solution and stirred. The solution was allowed to react at room temperature for 13 days.

This reaction solution was not a uniform solution and was in a slurry state containing insoluble crystals. The results of GPC analysis were: monomer: 20%; dimer: 36%; trimer: 24%; tetramer or higher: 20% (relative area ratio).

2) Preparation of a Solution for Forming a Thin Film 960 g of toluene was put in a 1000 ml-four neck-flask at room temperature, and 40 g of the slurry solution was added and stirred to prepare a solution for forming an organic thin film M. This solution was a non-uniform solution containing insoluble matters,

Example 14

Using Diethoxyethane as Reaction Solvent

1) Synthesis of Oligomer Solution 8.1 g (20 mmol) of ODS (Gelest; purity 95%) was put in a 100 ml-four neck-flask at room temperature, which was diluted by adding 41.2 g of 1,2-diethoxyethane. 0.53 g (29 mmol) of pure water and 0.20 g of 0.1N hydrochloric acid (hydrogen chloride 0.02 mmol, water 11 mmol) were added to the solution and stirred. An oligomer solution was obtained by reacting the solution at room temperature for 2 days.

This reaction solution was not a uniform solution and was in a slurry state containing insoluble crystals. The results of GPC analysis were: monomer: 30%; dimer: 31%; trimer: 23%; tetramer or higher: 16% (relative area ratio).

2) Preparation of a Solution for Forming a Thin Film 960 g of toluene was put in a 1000 ml-four neck-flask at room temperature, and 40 g of the slurry solution was added and stirred, to prepare a solution for forming an organic thin film N. This solution was a non-uniform solution containing insoluble matters.

B Solution for Forming an Organic Thin Film Using HDS as Raw Material

Example 15

Using Inorganic Acid as Catalyst; Reaction Time: 4 Days

1) Synthesis of Oligomer Solution 7.3 g (20 mmol) of HDS (Gelest; purity 95%) was put in a 100 ml-four neck-flask at room temperature, which was diluted by adding 42.0 g of THF. 0.53 g (29 mmol) of pure water and 0.20 g of 0.1N hydrochloric acid (hydrogen chloride 0.02 mmol, water 11 mmol) were added to the solution and stirred. An oligomer solution was obtained by reacting the solution at room temperature for 4 days.

C Solution for Forming an Organic Thin Film Using FAS as Raw Material

C-1 Example of Using Inorganic Acid as Catalyst

Example 16

FAS-9; Reaction Time 2 Days

1) Synthesis of Oligomer Solution 8.1 g (21 mmol) of FAS-9 (Gelest; purity 95%) was put in a 100 ml-four neck-flask at room temperature, which was diluted by adding 41.2 g of THF. 0.54 g (30 mmol) of pure water and 0.21 g of 0.1N hydrochloric acid (hydrogen chloride 0.02 mmol, water 12 mmol) were added to the solution and stirred. An oligomer solution was obtained by reacting the solution at room temperature for 2 days. The results of GPC analysis of the oligomer solution were: monomer: 14.3%; dimer: 51.6%; trimer: 28.1%; tetramer or higher: 5.9% (relative area ratio).

960 g of HFE-7300 (Sumitomo 3M Limited) was put in a 1000 ml-four neck-flask at room temperature, 40 g of the oligomer solution was added and stirred, and a uniform solution for forming an organic thin film O was obtained.

Example 17

FAS-9; Reaction Time: 20 Days

1) Synthesis of Oligomer Solution 8.1 g (21 mmol) of FAS-9 (Gelest; purity 95%) was put in a 100 ml-four neck-flask at room temperature, which was diluted by adding 41.2 g of THF. 0.54 g (30 mmol) of pure water and 0.21 g of 0.1N hydrochloric acid (hydrogen chloride 0.02 mmol, water 12 mmol) were added to the solution and stirred. An oligomer solution was obtained by reacting the solution at room temperature for 20 days. The results of GPC analysis of the oligomer solution were: monomer: 0%; dimer: 31.8%; trimer: 41.9%; tetramer or higher: 26.3% (relative area ratio).

2) Preparation of a Solution for Forming a Thin Film 960 g of perfluorohexyl methyl ether (HFE-7300; Sumitomo 3M Limited) was put in a 1000 ml-four neck-flask at room temperature, 40 g of the oligomer solution was added and stirred and a uniform solution for forming an organic thin film P was obtained.

Example 18

FAS-9; Water Increased; Reaction Time: 8 Days

1) Synthesis of Oligomer Solution 8.1 g (21 mmol) of FAS-9 (Gelest; purity 95%) was put in a 100 ml-four neck-flask at room temperature, which was diluted by adding 40.8 g of THF. 0.92 g (51 mmol) of pure water and 0.21 g of 0.1N hydrochloric acid (hydrogen chloride 0.02 mmol, water 12 mmol) were added to the solution and stirred. An oligomer solution was obtained by reacting the solution at room temperature for 8 days. The results of GPC analysis of the oligomer solution were: monomer: 0.2%; dimer: 28.9%; trimer: 41.1%; tetramer or higher: 29.8% (relative area ratio).

2) Preparation of a Solution for Forming a Thin Film 960 g of HFE-7300 (Sumitomo 3M Limited) was put in a 1000 ml-four neck-flask at room temperature, 40 g of the oligomer solution was added and stirred, and a uniform solution for forming an organic thin film Q was obtained.

Example 19

FAS-13; Reaction Time: 4 Days

1) Synthesis of Oligomer Solution 7.3 g (20 mmol) of FAS-13 (Gelest; purity 95%) was put in a 100 ml-four neck-flask at room temperature, which was diluted by adding 42.0 g of THF. 0.54 g (30 mmol) of pure water and 0.20 g of 0.1N hydrochloric acid (hydrogen chloride 0.02 mmol, water 12 mmol) were added to the solution and stirred. An oligomer solution was obtained by reacting the solution at room temperature for 4 days.

C-2 Example of Using Solid Acid as Catalyst

Example 20

Reaction Time: 4 Days

1) Synthesis of Oligomer Solution 8.1 g (21 mmol) of FAS-9 (Gelest; purity 95%) was put in a 100 ml-four neck-flask at room temperature, which was diluted by adding 40.8 g of THF. 0.76 g (42 mmol) of pure water and 0.20 g of Nafion were added to the solution and stirred. An oligomer solution was obtained by reacting the solution at room temperature for 4 days. The results of GPC analysis of the oligomer solution were: monomer: 0%; dimer: 18.2%; trimer: 48.7%; tetramer or higher: 33.1% (relative area ratio).

2) Preparation of a Solution for Forming a Thin Film 960 g of HFE-7300 (Sumitomo 3M Limited) was put in a 1000 ml-four neck-flask at room temperature, 40 g of the filtrate of the oligomer solution from which Nafion was removed was added and stirred, and a uniform solution for forming an organic thin film R was obtained.

D Coating Solution for Forming a Thin Film Using Oligomer as Raw Material

Example 21

Example of Using FAS Oligomer

1) Synthesis of Non-Hydrolyzed Oligomer Solution by Alkaline Catalyst 3.2 g (8 mmol) of FAS-9 (Gelest; purity 95%) was put in a 50 ml-four neck-flask at room temperature, which was diluted by adding 16.3 g of THF. 0.02 g (0.004 mmol) of 0.2N-NaOH was added to the solution and stirred. A non-hydrolyzed oligomer solution was obtained by reacting the solution at room temperature for 7 days. The results of GPC analysis of the oligomer solution were monomer: 54.5%; dimer: 28.4%; trimer: 11.7%; tetramer or higher: 5.3% (relative area ratio).

2) Synthesis of Hydrolyzed Oligomer Solution from Non-Hydrolyzed Oligomer by Acid Catalyst In a 50 ml-four neck-flask, 10 g of the non-hydrolyzed oligomer solution synthesized by alkaline condensation was added with 0.06 g (0.006 mmol) of 0.1 N hydrochloric acid and 0.1 g (5.6 mmol) of pure water and stirred. An oligomer solution was obtained by reacting the solution at room temperature for 8 days. The results of GPC analysis of the oligomer solution were: monomer: 2.3%; dimer: 46.5%; trimer: 36.6%; tetramer or higher: 14.6% (relative area ratio).

3) Preparation of a Solution for Forming a Thin Film 240 g of HFE-7300 (Sumitomo 3M Limited) was put in a 300 ml-four neck-flask at room temperature, 10 g of the oligomer solution was added and stirred, and a uniform solution for forming an organic thin film S was obtained.

Example 22

Example of Using ODS Oligomer

1) Synthesis of Non-Hydrolyzed Oligomer Solution by Alkaline Catalyst 10.0 g (25 mmol) of ODS (Gelest; purity 95%) was put in a 100 ml-four neck-flask at room temperature, which was diluted by adding 40.0 g of THF. 0.20 g (0.04 mmol) of 0.2 N-NaOH was added to the solution and stirred. A non-hydrolyzed oligomer solution was obtained by reacting the solution at room temperature for 30 days. The results of GPC analysis of the oligomer solution were: monomer: 49.6%; dimer: 26.8%; trimer: 7.9%; tetramer: 2.5%; pentamer or higher: 13.2% (relative area ratio).

2) Synthesis of Hydrolyzed Oligomer Solution from Non-Hydrolyzed Oligomer by Acid Catalyst To a 50 ml-four neck-flask, 8.1 g of the non-hydrolyzed oligomer solution synthesized by the alkaline condensation and 1.8 g of THF were mixed. 0.1 g of 0.1N hydrochloric acid (hydrogen chloride 0.1 mmol, water 6 mmol) and 0.1 g of pure water (5.6 mmol) were added to the solution and stirred. An oligomer solution was obtained by reacting the solution at room temperature for 8 days. The results of GPC analysis of the oligomer solution were: monomer: 0.9%; dimer: 29.0%; trimer: 35.6%; tetramer: 21.3%; pentamer or higher: 13.1% (relative area ratio).

3) Preparation of a Solution for Forming a Thin Film 960 g of toluene was put in a 2000 ml-four neck-flask at room temperature, 40 g of the oligomer solution was added and stirred, and a uniform solution for forming an organic thin film T was obtained.

E Comparative Example

Comparative Example 1

Example of Dimer without OH Group

1) Synthesis of Oligomer Solution (Alkaline Condensation)

10.0 g (25 mmol) of ODS (Gelest; purity 95%) was put in a 100 ml-four neck-flask at room temperature, which was diluted by adding 40.0 g of THF. 0.20 g (0.04 mmol) of 0.2N-NaOH was added to the solution and stirred. An oligomer solution was obtained by reacting the solution at room temperature for 30 days. The results of GPC analysis of the oligomer solution were: monomer: 49.6%; dimer: 26.8%; trimer: 7.9%; tetramer: 2.5%; pentamer or higher: 13.2% (relative area ratio).

Components were separated from the reaction solution and dimers and trimers in which all of the hydrolysable groups are methoxy group (without OH group) were obtained.

2) Preparation of Solution for Forming a Thin Film 1.0 g (1.3 mmol) of ODS-dimer (permethoxy compound) synthesized from ODS (Gelest: purity 95%) was put in a 100 ml-four neck-flask at room temperature, the solution was dissolved by adding 199 g of toluene, and a solution for forming an organic thin film a was obtained.

Comparative Example 2

Example of Trimer without OH Group 0.5 g (0.5 mmol) of ODS-trimer (permethoxy compound) obtained in Comparative Example 1 was put in a 100 ml-four neck-flask, the solution was dissolved by adding 99 of toluene, and a solution for forming an organic thin film b was obtained.

Comparative Example 3

Example of Using ODS as Raw Material, and Alkali as Catalyst

1) Synthesis of Oligomer Solution 10.0 g (25 mmol) of ODS (Gelest; purity 95%) was put in a 100 ml-four neck-flask at room temperature, which was diluted by adding 40.0 g of THF. 0.20 g (0.04 mmol) of 0.2N-NaOH was added to the solution and stirred. An oligomer solution was obtained by reacting the solution at room temperature for 30 days. The results of GPC analysis of the oligomer solution were: monomer: 49.6%; dimer: 26.8%; trimer: 7.9%; tetramer: 2.5%; pentamer or higher: 13.2% (relative area ratio).

2) Preparation of Solution for Forming a Thin Film 960 g of toluene was put in a 2000 ml-four neck-flask at room temperature, 40 g of the oligomer solution was added and stirred, and a solution for forming an organic thin film c was obtained.

Comparative Example 4-1

Using Titanium Tetrabutoxide as Catalyst; Standard Concentration

1) Preparation of an Auxiliary Agent for Forming an Organic Thin Film 16.5 g (43 mmol) of ODS (Gelest; purity 95%) was put in a 200 ml-four neck-flask at room temperature, which was diluted by adding 5.65 g (16.4 mmol) of titanium tetrabutoxide (Nippon Soda Co. Ltd.), and by adding 76.1 g of Sorbesso 150 (Exxon Mobil). The solution was added with 1.7 g of distilled water at 25° C., allowed to react at room temperature for 24 hours, and an auxiliary agent for forming an organic thin film was obtained.

2) Preparation of a Solution for Farming an Organic Thin Film Before Dilution 81.0 g (200 mmol) of ODS (Gelest; purity 95%) was put in a 1000 ml-four neck-flask at room temperature, 0.31 g of the above-mentioned auxiliary agent for forming an organic thin film was added, which was diluted by adding 415 g of Sorbesso 150 (Exxon Mobil). The solution was added with 3.7 g of distilled water, allowed to react at room temperature for 10 days, and a solution for forming an organic thin film before dilution was obtained.

3) Preparation of a Solution for Forming a Thin Film 480 g of Sorbesso 150 (Exxon Mobil) was put in a 1000 ml-four neck-flask at room temperature. 20 g of the solution for forming an organic thin film before dilution was added and stirred, and a solution for forming an organic thin film d-1 was obtained.

Comparative Example 4-2

Standard Concentration×¼

495 g of Sorbesso 150 (Exxon Mobil) was put in a 1000 ml-four neck-flask at room temperature, 5 g of the solution for forming an organic thin film before dilution obtained in step 2) of Comparative Example 4-1 was added and stirred, and a solution for forming an organic thin film d-2 was obtained.

Comparative Example 4-3

Standard Concentration×⅒

498 g of Sorbesso 150 (Exxon Mobil) was put in a 1000 ml-four neck-flask at room temperature, 2 g of the solution for forming an organic thin film before dilution obtained in step 2) of Comparative Example 4-1 was added and stirred, and a solution for forming an organic thin film d-3 was obtained.

Comparative Example 5

Using Methanol as Reaction Solvent

1) Synthesis of Oligomer Solution 8.1 g (20 mmol) of ODS (Gelest; purity 95%) was put in a 100 ml-four neck-flask at room temperature, which was diluted by adding 41.2 g of methanol. 0.53 g (29 mmol) of pure water and 0.20 g of 0.1N hydrochloric acid (hydrogen chloride 0.02 mmol, water 11 mmol) were added to the solution and stirred. The solution was allowed to react for 1 day.

The reaction solution was not a uniform solution, and was in a slurry state containing insoluble crystals. The results of GPC analysis were: monomer: 85%; dimer: 15% (relative area ratio).

2) Preparation of a Solution for Forming a Thin Film 960 g of toluene was put in a 1000 ml-four neck-flask at room temperature, 40 g of the slurry solution was added and stirred to prepare a solution for forming an organic thin film e. The solution was a non-uniform solution containing insoluble matters.

Comparative Example 6

Using Anisole as Reaction Solvent

1) Synthesis of Oligomer Solution 8.1 g (20 mmol) of ODS (Gelest; purity 95%) was put in a 100 ml-four neck-flask at room temperature, which was diluted by adding 41.2 g of anisole. 0.53 g (29 mmol) of pure water and 0.20 g of 0.1N hydrochloric acid (hydrogen chloride 0.02 mmol, water 11 mmol) were added to the solution and stirred. The solution was allowed to react for 13 days.

The reaction solution was not a uniform solution, and was in a slurry state containing insoluble crystals. The results of GPC analysis were: monomer: 75%; dimer: 8%; trimer 3%; tetramer or higher: 14% (relative area ratio).

2) Preparation of a Solution for Forming a Thin Film 960 g of toluene was put in a 1000 ml-four neck-flask at room temperature, 40 g of the slurry solution was added and stirred to prepare a solution for forming an organic thin film f. The solution was a non-uniform solution containing insoluble matters.

II Formation of Organic Thin Film

Ultrasonic washing with pure water and alcohol was performed as prewashing, and the substrate which had further undergone UV ozone-treatment was immersed in the solution for forming an organic thin film for a certain time, then pulled up. The substrate was subjected to a ultrasonic washing with an organic solvent, dried at 60° C. for 10 minutes, to form an organic thin film.

Iii Evaluation of Organic Thin Film (Contact Angle Measurement Results)

The organic metal thin film was evaluated by the following methods.

5 μl of water or tetradecane (hereinafter abbreviated as "TD") was dropped from a microsyringe to each substrate surface, and the contact angle was measured 60 seconds later with a contact angle measuring device (360S type; Erma).

The results are shown in Table 1 (Examples) and Table 2 (Comparative Examples).

TABLE 1

(Examples)

| | | | Solution for forming an organic solvent | | | Immersion | Contact angle (°) | |
|---|---|---|---|---|---|---|---|---|
| Ex. | type | RM | catalyst | Reaction solvent | substrate | Time (min) | water | TD |
| 1 | A | ODS | HCl | THF | OA-10 | 1 | 110 | 43 |
| 2 | B | ODS | HCl | THF | OA-10 | 1 | 110 | 43 |
| 2 | B | ODS | HCl | THF | Si | 3 | 110 | 41 |
| 3 | C | ODS | HCl | THF | OA-10 | 1 | 110 | 43 |
| 4 | D | ODS | HCl | THF | OA-10 | 3 | 108 | 43 |
| 5 | E | ODS | HCl | THP | Si | 3 | 107 | 39 |
| 5 | E | ODS | HCl | THP | OA-10 | 1 | 109 | 41 |
| 6 | F | ODS | Sulfuric acid | THF | OA-10 | 3 | 106 | 41 |
| 7 | G | ODS | p-TSA | THF | OA-10 | 3 | 107 | 40 |
| 8 | H | ODS | CF$_3$COOH | THF | OA-10 | 3 | 107 | 41 |
| 9 | I | ODS | Nafion | THF | OA-10 | 3 | 108 | 37 |
| 10-1 | J-1 | ODS | HCl | THF | OA-10 | 1 | 107 | 44 |
| 10-2 | J-2 | ODS | HCl | THF | OA-10 | 1 | 108 | 44 |
| 10-3 | J-3 | ODS | HCl | THF | OA-10 | 1 | 108 | 44 |
| 11-1 | K-1 | ODS | HCl | THF | OA-10 | 1 | 110 | 43 |
| 11-2 | K-2 | ODS | HCl | THF | OA-10 | 1 | 108 | 41 |
| 12 | L | ODS | HCl | MIBK | Si | 1 | 103 | 39 |
| 12 | L | ODS | HCl | MIBK | Si | 3 | 106 | 41 |
| 13 | M | ODS | HCl | CPME | OA-10 | 3 | 106 | 41 |
| 14 | N | ODS | HCl | 1,2-DEE | Si | 3 | 107 | 40 |
| 14 | N | ODS | HCl | 1,2-DEE | OA-10 | 3 | 111 | 43 |
| 16 | O | FAS-9 | HCl | THF | OA-10 | 10 | 96 | 65 |
| 17 | P | FAS-9 | HCl | THF | Si | 10 | 100 | 67 |
| 17 | P | FAS-9 | HCl | THF | SUS304 | 10 | 102 | 63 |
| 17 | P | FAS-9 | HCl | THF | Ni | 10 | 106 | 60 |
| 18 | Q | FAS-9 | HCl | THF | OA-10 | 10 | 96 | 66 |
| 20 | R | FAS-9 | Nafion | THF | OA-10 | 1 | 94 | 67 |
| 21 | S | FAS-OL | HCl | THF | OA-10 | 10 | 95 | 65 |
| 22 | T | ODS-OL | HCl | THF | OA-10 | 3 | 108 | 42 |

TABLE 2

Comparative Example

| | | | Solution for forming an organic thin film | | | Immersion | Contact angle (°) | |
|---|---|---|---|---|---|---|---|---|
| Comp. Ex. | type | RM | catalyst | Reaction solvent | substrate | Time (min) | water | TD |
| 1 | a | ODS | — | — | OA-10 | 5 | 70 | 16 |
| 2 | b | ODS | — | — | OA-10 | 5 | 57 | 8 |

TABLE 2-continued

Comparative Example

Solution for forming an organic thin film

| Comp. Ex. | type | RM | catalyst | Reaction solvent | substrate | Immersion Time (min) | Contact angle (°) water | TD |
|---|---|---|---|---|---|---|---|---|
| 3 | c | ODS | NaOH | THF | OA-10 | 5 | 60 | 11 |
| 4-1 | d-1 | ODS | — | — | OA-10 | 1 | 106 | 39 |
| 4-2 | d-2 | ODS | — | — | OA-10 | 1 | 92 | 31 |
| 4-3 | d-3 | ODS | — | — | OA-10 | 1 | 83 | 22 |
| 5 | e | ODS | HCl | MeOH | Si | 1 | 90 | 38 |
| 6 | f | ODS | HCl | anisole | OA-10 | 3 | 93 | 31 |

EXPLANATION OF THE ABBREVIATION

OA-10: Non-alkaline glass
Si: Silicone wafer
SUS304: stainless steel
Ni: Nickel plate
MIBK: methyl isobutyl ketone
CPME: cyclopentyl methyl ether
1,2-DEE: 1,2-diethoxyethane
p-TSA: p-toluenesulfonic acid
FAS-OL: Oligomer hydrolysate of FAS-9
ODS-OL: Oligomer hydrolysate of ODS
IV Composition Analysis by GPC and HPLC
IV-1 when Using THF
1) Synthesis of Oligomer Solution 8.1 g (20 mmol) of ODS (Gelest; purity 95%) was put in a 100 ml-four neck-flask at room temperature, which was diluted by adding 41.2 g of THF. 0.53 g (29 mmol) of pure water and 0.20 g of 0.1N hydrochloric acid (hydrogen chloride 0.02 mmol, water 11 mmol) were added to the solution and stirred. An oligomer solution was added by reacting the solution for 4 days.

2) GPC Analysis Conditions and Analysis Results
[Analysis Conditions]
Column: Shodex KF-802 (Showa Denko); Ø 8 mm×300 mm; exclusion limit molecular weight: 5000
Oven: 35° C.; detecting device: RI, eluent: THF; flow rate 1.0 mL/min
[Analysis Results]

The above oligomer reaction solution was diluted to 25-fold with THF, and 5.0 μl thereof was used for analysis.

The results were: monomer: 3.9%, dimer 22.3%; trimer 43.2%; tetramer or higher 30.6% (relative area ratio). The results are shown in FIG. 1.

3) Analysis Conditions and Analysis Results of Reverse-Phase HPLC
[Analysis Conditions]
Column: Mightysil RP-18 150-4.6 (5 μm) (Kanto Chemical Co., Inc.)
Oven: 30° C.; detecting device: RI, eluent: $CH_3CN:THF=55:45$; flow rate 1.1 mL/min
[Analysis Results]

The above oligomer reaction solution was diluted to 25-fold with THF, and 10.0 μL thereof was used for analysis. The results are shown in FIG. 2. (Ingredients with higher hydrolysis degree have a faster elution time, even if they have the same polymerization level).

INDUSTRIAL APPLICABILITY

By using the solution for forming an organic thin film of the present invention, it is possible to form rapidly (about 1 minute) a dense monomolecular film or organic film with less impurity on a substrate made of various materials.

Further, the solution for forming an organic thin film of the present invention is stable even when stored for one month or more, at room temperature.

Further, the solution for forming an organic thin film of the present invention can form an excellent organic thin film even with a low concentration, as compared with the conventional method (Comparative Example 4) comprising performing hydrolytic condensation using alkoxide titanium as catalyst.

The solution for forming an organic thin film prepared by the present invention can be applied suitably for equipments which require a heat-resistant, weather-resistant, and abrasion-resistant ultra thin film coating, such as electronics products, such as electrical appliances, car, industrial devices, mirror, optical lenses, etc., or for forming design pattern of electric devices, etc. Further, it is also useful as a mold lubricant for a mold, etc.

The invention claimed is:

1. A solution for forming a monomolecular film comprising:
   (A) at least one organic metal compound shown by formula (I) provided that at least one organic metal compound contains a hydroxyl group

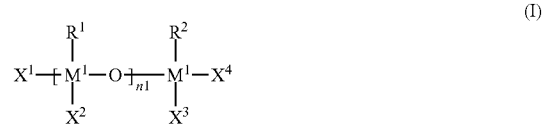

(I)

wherein
   $R^1$ and $R^2$ represent a hydrocarbon group with 1 to 30 carbons optionally having a substituent, or a halogenated hydrocarbon group with 1 to 30 carbons optionally having a substituent;
   $X^1$, $X^2$, $X^3$, and $X^4$ each independently represents $R^1$, $R^2$, a hydroxyl group, or a hydrolysable group; provided that not all of $X^1$, $X^2$, $X^3$, and $X^4$ are $R^1$ or $R^2$; when n1 is 2 or more, each $R^1$ and each $X^2$ may be the same or different;
   $X^1$ and $X^4$ may together form an oxygen atom, to form a ring wherein $M^1$ and oxygen atom are alternately bonded;
   $M^1$ represents at least one metal atom selected from the group consisting of Si, Ge, Sn, Ti, and Zr; and
   n1 represents an integer of 1 to 4; and
(B) at least one organic metal compound shown by formula (II)

(II)

wherein R³ represents a hydrocarbon group with 1 to 30 carbons optionally having a substituent, or a halogenated hydrocarbon group with 1 to 30 carbons optionally having a substituent;

M² represents at least one metal atom selected from the group consisting of Si, Ge, Sn, Ti, and Zr;

X⁵ represents a hydroxyl group or a hydrolysable group; and m represents an integer of 1 to 3;

wherein the solution is
$40 \leq [(A)/\{(A)+(B)\}] \times 100 \leq 100$ (mass %), and
$0 \leq [(B)/\{(A)+(B)\}] \times 100 \leq 60$ (mass %); and a mass ratio of an organic metal compound in which n1=2 with respect to an organic metal compound in which n1=1 in the organic metal compound shown by formula (I) is greater than 0.5.

2. The solution for forming a monomolecular film according to claim 1, comprising at least one organic metal compound selected from the group consisting of:

at least one organic metal compound shown by formula (III)

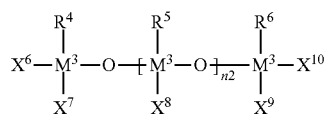

(III)

wherein
$R^4$, $R^5$ and $R^6$ each independently represents a hydrocarbon group with 1 to 30 carbons optionally having a substituent, or a halogenated hydrocarbon group with 1 to 30 carbons optionally having a substituent;

$X^6$, $X^7$, $X^8$, $X^9$, and $X^{10}$ each independently represents any one of $R^4$ to $R^6$, a hydroxyl group, or a hydrolysable group; provided that not all of $X^6$, $X^7$, $X^8$, $X^9$, and $X^{10}$ are any one of $R^4$ to $R^6$, and at least one of $X^6$, $X^7$, $X^8$, $X^9$, and $X^{10}$ represents a hydroxyl group, and at least one of them represents a hydrolysable group;

when n2 is 2 or more, each $R^5$ and each $X^8$ may be the same or different;

M³ represents at least one metal atom selected from the group consisting of Si, Ge, Sn, Ti, and Zr; and n2 represents 0 or an integer of 1 to 3; and at least one cyclic organic metal compound represented by formula (IV)

(IV)

wherein
$R^7$ represents a hydrocarbon group with 1 to 30 carbons optionally having a substituent, or a halogenated hydrocarbon group with 1 to 30 carbons optionally having a substituent;

$X^{11}$ represents $R^7$, a hydroxyl group, or a hydrolysable group; provided that not all of $X^{11}$ are $R^7$, and at least one of $X^{11}$ represents a hydroxyl group, and at least one of $X^{11}$ represents a hydrolysable group;

each $R^7$ and each $X^{11}$ may be the same or different;

M⁴ represents at least one metal atom selected from the group consisting of Si, Ge, Sn, Ti and Zr; and n3 represents an integer of 2 to 5.

3. An organic thin film obtained by allowing to contact the solution for forming an organic thin film according to claim 1 with a substrate.

4. The organic thin film according to claim 3, wherein the organic thin film is a monomolecular thin film.

* * * * *